(12) United States Patent
Katoh et al.

(10) Patent No.: US 11,347,980 B2
(45) Date of Patent: May 31, 2022

(54) POSITIONAL-DEVIATION CORRECTING DEVICE AND IMAGE FORMING APPARATUS INCLUDING POSITIONAL-DEVIATION CORRECTING DEVICE

(71) Applicant: Ricoh Comapny, Ltd., Tokyo (JP)

(72) Inventors: Taiichi Katoh, Kanagawa (JP); Tatsuya Ishii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 14 days.

(21) Appl. No.: 17/032,832

(22) Filed: Sep. 25, 2020

(65) Prior Publication Data
US 2021/0097357 A1 Apr. 1, 2021

(30) Foreign Application Priority Data
Oct. 1, 2019 (JP) .............................. JP2019-181466

(51) Int. Cl.
*G03G 15/00* (2006.01)
*G06K 15/02* (2006.01)

(52) U.S. Cl.
CPC ....... *G06K 15/027* (2013.01); *G03G 15/5062* (2013.01); *G06K 15/1842* (2013.01)

(58) Field of Classification Search
USPC .......................................................... 399/15
See application file for complete search history.

(56) References Cited

U.S. PATENT DOCUMENTS

| | | | |
|---|---|---|---|
| 2015/0125188 A1* | 5/2015 | Cho | G03G 15/5058 399/301 |
| 2016/0159598 A1 | 6/2016 | Yamane et al. | |
| 2017/0199488 A1* | 7/2017 | Maeda | H04N 1/48 |
| 2019/0166274 A1 | 5/2019 | Ishii et al. | |
| 2019/0166275 A1 | 5/2019 | Ishii et al. | |
| 2019/0300310 A1 | 10/2019 | Ishii et al. | |

(Continued)

FOREIGN PATENT DOCUMENTS

| | | |
|---|---|---|
| JP | 10-093787 | 4/1998 |
| JP | 2005-010733 | 1/2005 |

(Continued)

*Primary Examiner* — Quana Grainger
(74) *Attorney, Agent, or Firm* — Xsensus LLP

(57) ABSTRACT

A positional-deviation correcting device includes a reading device and control circuitry. The reading device reads recording media on which marks and each of adjustment charts having different image densities are formed in accordance with the image densities. The control circuitry acquires data on image formation positions of the marks on the recording media, based on a reading result of the marks; and corrects an image formation position of an image to be formed on a recording medium. The control circuitry calculates a correction value of the image formation position corresponding to an image density for each of the image densities corresponding to the adjustment charts on a one-on-one relationship, based on a reading result of the adjustment charts; interpolates correction values corresponding to the image densities on a one-on-one relationship; and calculates a correction value of the image formation position corresponding to another image density different from the image densities.

7 Claims, 18 Drawing Sheets

(56) References Cited

U.S. PATENT DOCUMENTS

| | | |
|---|---|---|
| 2020/0099812 A1 | 3/2020 | Ishii |
| 2020/0171816 A1 | 6/2020 | Katoh et al. |

FOREIGN PATENT DOCUMENTS

| | | |
|---|---|---|
| JP | 2005-223381 | 8/2005 |
| JP | 2007-318347 | 12/2007 |
| JP | 2013-018653 | 1/2013 |
| JP | 2014-236260 | 12/2014 |
| JP | 2015-201843 | 11/2015 |
| JP | 2016-139026 | 8/2016 |
| JP | 2016-175776 | 10/2016 |
| JP | 2016-180857 | 10/2016 |
| JP | 2017-157962 | 9/2017 |
| JP | 2017-159971 | 9/2017 |
| JP | 2018-124455 | 8/2018 |
| JP | 2018-157413 | 10/2018 |
| JP | 2018-157417 | 10/2018 |
| JP | 2019-103119 | 6/2019 |
| JP | 2019-103120 | 6/2019 |
| JP | 2019-182657 | 10/2019 |
| JP | 2020-058012 | 4/2020 |

\* cited by examiner

POSITIONAL-DEVIATION CORRECTING DEVICE AND IMAGE FORMING APPARATUS INCLUDING POSITIONAL-DEVIATION CORRECTING DEVICE

CROSS-REFERENCE TO RELATED APPLICATION

This patent application is based on and claims priority pursuant to 35 U.S.C. § 119(a) to Japanese Patent Application No. 2019-181466, filed on Oct. 1, 2019, in the Japan Patent Office, the entire disclosure of which is hereby incorporated by reference herein.

BACKGROUND

Technical Field

Embodiments of the present disclosure are related to a positional-deviation correcting device and an image forming apparatus including the positional-deviation correcting device.

Related Art

A high degree of image position accuracy is required for a printed material in an image forming apparatus. However, an image may not be formed at a target position since the position of an image written to a sheet may be deviated by the influence of, for example, a change in the shape of the sheet caused by heat used for fixing the image on the sheet. For this reason, there is proposed a technique of forming and reading a correction mark on a sheet, calculating a deviation amount of the printing position from a reading result, and correcting an image formation position. There is also a technique in which an adjustment chart is selected based on an image density, and adjustment is performed with a toner adhesion amount close to an image density to be actually printed, thereby detecting a positional deviation amount with high accuracy.

SUMMARY

In an aspect of the present disclosure, there is provided a positional-deviation correcting device that includes a reading device and control circuitry. The reading device reads a plurality of recording media on which a plurality of marks and each of a plurality of adjustment charts having different image densities are formed in accordance with the image densities. The control circuitry acquires data on image formation positions of the marks on the plurality of recording media, based on a reading result of the marks; and corrects an image formation position of an image to be formed on a recording medium. The control circuitry calculates a correction value of the image formation position corresponding to an image density for each of the image densities corresponding to the plurality of adjustment charts on a one-on-one relationship, based on a reading result of the plurality of adjustment charts; interpolates a plurality of correction values corresponding to the image densities on a one-on-one relationship; and calculates a correction value of the image formation position corresponding to another image density different from the image densities.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
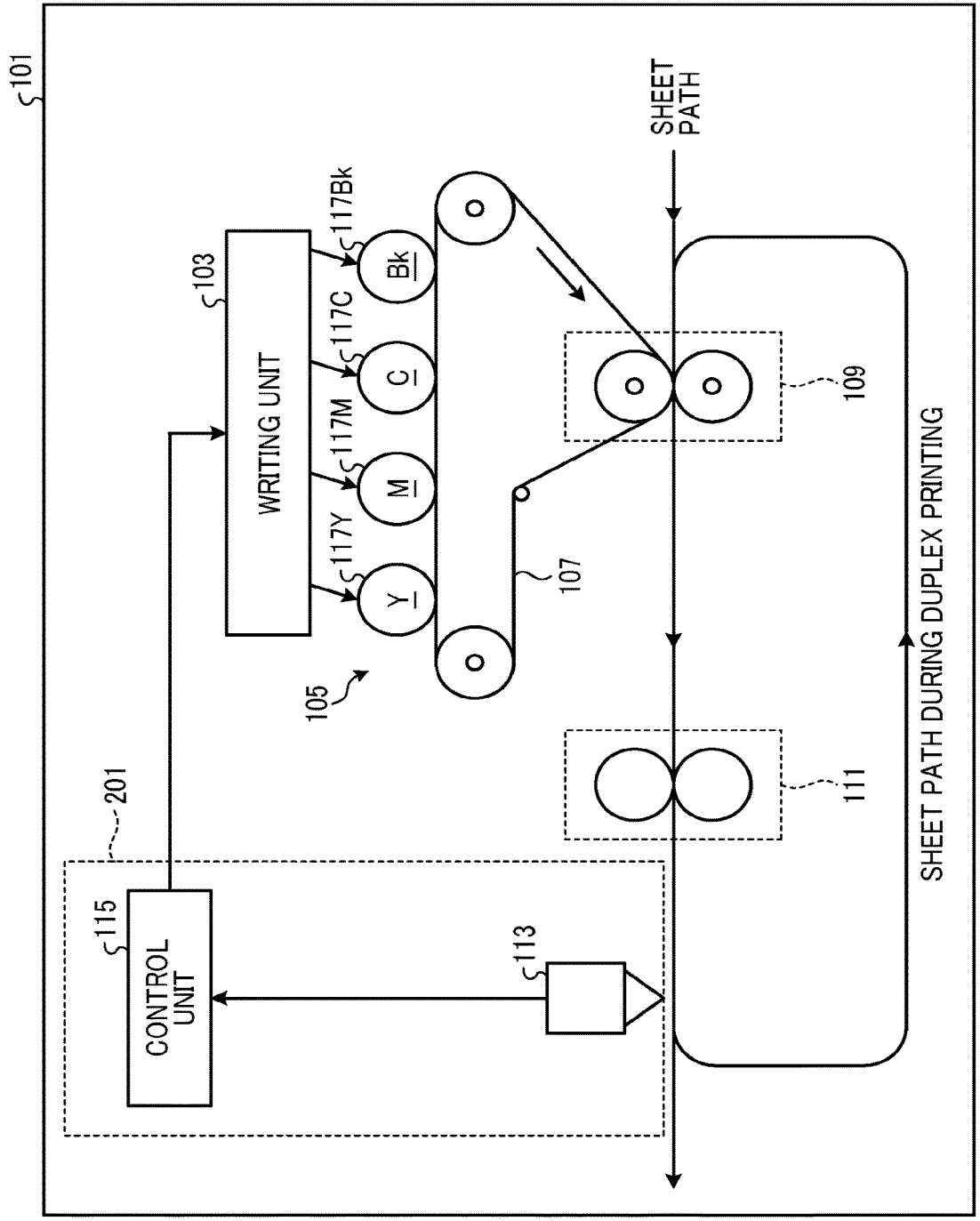
FIG. 1 is a block diagram of the configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of a positional-deviation correcting device and an image forming apparatus are described in detail with reference to the accompanying drawings.

Embodiments FIG. 1 is a block diagram of the configuration of an image forming apparatus 101 according to an embodiment of the present disclosure. The image forming apparatus 101 is, for example, an electrophotographic image forming apparatus. FIG. 1 is a schematic cross-sectional view illustrating the configuration of a portion related to image formation and fixing on a sheet as a recording medium in the image forming apparatus 101. The image forming apparatus 101 includes a writing unit 103, an image forming unit 105, an intermediate transfer belt 107, a secondary transfer unit 109, a fixing unit 111, a reading unit 113, and a control unit 115. An image forming device in the image forming apparatus 101 includes, for example, the image forming unit 105, the intermediate transfer belt 107, the secondary transfer unit 109, and the fixing unit 111. The image forming device forms a plurality of marks and each of a plurality of adjustment charts having different image densities onto each of a plurality of recording media in accordance with the plurality of image densities. In a case where the technical idea in the present embodiment is realized by a positional-deviation correcting device 201, as illustrated in FIG. 1, the positional-deviation correcting device 201 includes the reading unit 113, the control unit 115, and various components included in the control unit 115.

The writing unit 103 forms a transfer image on the image forming unit 105 with laser light. The writing unit 103 includes, for example, a charging unit and an exposure unit. The charging unit is disposed around a photoconductive drum 117 in the image forming unit 105 and uniformly charges the photoconductive drum 117. The exposure unit includes a light source (for example, a laser diode (LD)) controlled to be turned on and off in accordance with image data transmitted from the control unit 115, and scans the photoconductive drum 117 with light emitted from the light source to form an electrostatic latent image of an image indicated by the image data on the photoconductive drum 117. Thus, the writing unit 103 writes the electrostatic latent image on the photoconductive drum 117.

The image forming unit 105 holds a photoconductor, developer, and toner, and forms a toner image with laser light from the writing unit 103. In the present embodiment, for example, each of the image forming units 105 includes the photoconductive drum 117, a developing unit, and a transfer roller corresponding to each color. The image forming units 105 form toner images of yellow, magenta, cyan, and black (hereinafter, referred to as Y, M, C, and Bk, respectively) on the intermediate transfer belt 107. The image forming units 105 are arranged side by side to face the intermediate transfer belt 107.

The photoconductive drum 117 is an image bearer to bear an image formed by the writing unit 103. The developing unit is a developing device to develop an electrostatic latent image with toner serving as a developer. The toner used for development is stored in a toner bottle and supplied from a toner supply unit.

The intermediate transfer belt 107 is subjected to primary transfer before the toner image formed by the image forming unit 105 is transferred onto a sheet. For example, toner images of Y, M, C, and Bk colors formed by the image forming units 105 are primarily transferred onto the intermediate transfer belt 107 in a superimposed manner by the transfer rollers corresponding to the respective colors.

A recording sheet as a recording medium is conveyed from a sheet feeding device to the secondary transfer unit 109 along a sheet path by conveying rollers. That is, the recording sheet is conveyed to a nipping point between the intermediate transfer belt 107 and a secondary transfer belt in synchronization with the toner image on the intermediate transfer belt 107.

The secondary transfer unit 109 secondarily transfers the toner image, which has been transferred onto the intermediate transfer belt 107, onto a sheet. The secondary transfer unit 109 performs secondary transfer of the toner image transferred to the intermediate transfer belt 107 onto the recording sheet at the nipping point.

The fixing unit 111 fixes the toner image transferred to the recording sheet by heat. For example, the fixing unit 111 is a fixing unit that heats and presses the toner image, which has been formed by the secondary transfer unit 109, with a fixing member to fix the toner image on the recording sheet. The fixing unit 111 applies heat and pressure to the recording sheet to melt and weld the toner image to the recording sheet, thereby fixing the toner image. The recording sheet on which the image is formed by the fixing unit 111 is further conveyed to the reading unit 113. In a case in which printing is performed on both sides of the recording sheet, the fixing unit 111 returns the recording sheet on which the image is fixed on the first side to the secondary transfer unit 109 through a sheet path during double-sided printing, and forms the image on the second side in the same procedure as the first side.

The reading unit 113 reads a plurality of recording media on which a plurality of marks (hereinafter referred to as correction marks) and each of a plurality of adjustment charts having different image densities are formed in accordance with the image densities. That is, the reading unit 113 detects the positions of the correction marks of the printed sheet and the shape of the printed sheet. For example, the reading unit 113 reads a plurality of recording media (for example, sheets of paper) on which a plurality of correction marks and each of a plurality of adjustment charts having different image densities are formed in accordance with the image densities. That is, the reading unit 113 reads the recording media to read the correction marks and the adjustment charts. The reading unit 113 is implemented with a reading device such as a line sensor or a line scanner in which an imaging element such as a charged-coupled device (CCD) or a complementary metal oxide semiconductor (CMOS) is built. The reading unit 113 outputs the read data to the control unit 115.

The control unit 115 acquires data (hereinafter, referred to as mark position data) on the image formation positions of the marks with respect to the recording media based on the reading results of the correction marks. That is, the control unit 115 calculates correction values from the shape of the recording media and the mark position data, and corrects the image formation positions. The control unit 115 calculates a correction value of the image formation position corresponding to the image density for each of the plurality of image densities corresponding to the plurality of adjustment charts in a one-on-one relationship, based on reading results for the plurality of adjustment charts. The control unit 115 interpolates a plurality of correction values corresponding to the plurality of image densities in a one-on-one relationship to calculate a correction value of the image formation position corresponding to another image density different from the plurality of image densities. The functions of the control unit 115 are described in detail later.

Figure 2:
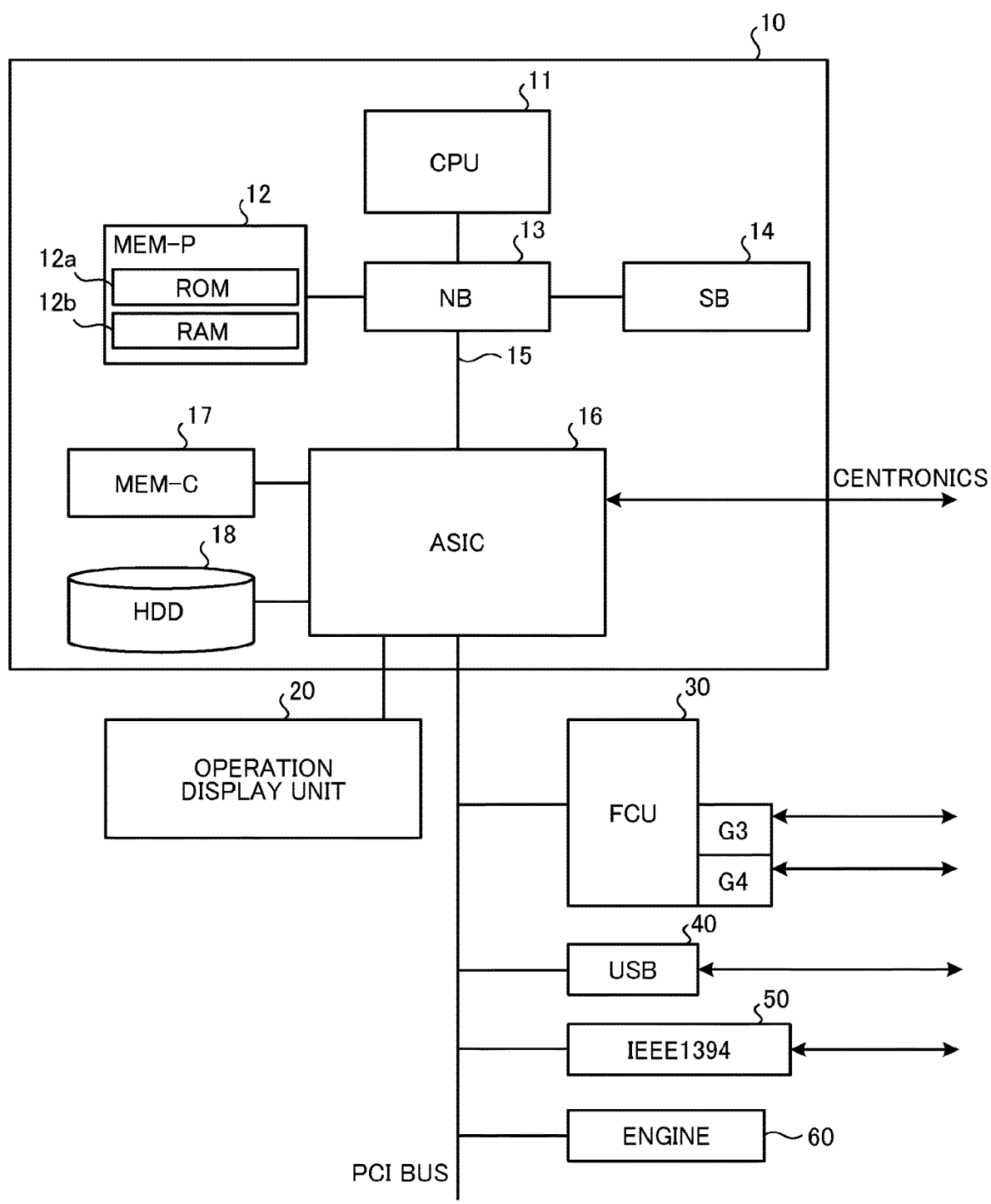
FIG. 2 is a block diagram of the configuration of hardware of the image forming apparatus of FIG. 1.

FIG. 2 is a block diagram of the configuration of hardware of the image forming apparatus 101 according to the present embodiment. As illustrated in FIG. 1, the image forming apparatus 101 has a configuration in which a controller 10 and an engine unit (or engine) 60 are connected via a peripheral component interface (PCI) bus. The controller 10 is a controller that controls the entire image forming apparatus 101, rendering, communications, and inputs from an operation unit. The engine unit 60 is, for example, a printer engine that is connectable to the PCI bus and is, for example, a monochrome plotter, a one-drum color plotter, a four-drum color plotter, a scanner, or a facsimile unit. The engine unit 60 includes an image processing section to perform image processing such as error diffusion and gamma conversion, in addition to a so-called engine section such as a plotter.

The controller 10 has a CPU 11, a north bridge (NB) 13, a system memory (MEM-P) 12, a south bridge (SB) 14, an application specific integrated circuit (ASIC) 16, a local memory (MEM-C) 17, and a hard disk drive (HDD) 18 and connects the NB 13 with the ASIC 16 via an accelerated graphics port (AGP) bus 15. The MEM-P 12 further includes a read only memory (ROM) 12a and a random access memory (RANI) 12b.

The CPU 11 controls the entire image forming apparatus 101, includes a chip set including the NB 13, the MEM-P 12, and the SB 14, and is connected to other devices via the chip set.

The NB 13 is a bridge that connects the CPU 11, the MEM-P 12, the SB 14, and the AGP bus 15, and includes a memory controller that controls reading from and writing to the MEM-P 12, a PCI master, and an AGP target.

The MEM-P 12 is a system memory used as, for example, a memory for storing programs and data, a memory for expanding programs and data, and a memory for drawing of a printer, and includes a ROM 12a and a RAM 12b. The ROM 12a is a read-only memory used as a memory for storing programs and data, and the RANI 12b is a writable and readable memory used as a memory for expanding programs and data, and a memory for drawing of a printer.

The SB 14 is a bridge that connects NB 13 to PCI devices and peripheral devices. The SB 14 is connected to the NB 13 via a PCI bus, and a network interface (I/F) unit and the like are also connected to the PCI bus.

The ASIC 16 is an integrated circuit for image processing having hardware elements for image processing, and serves as a bridge that connects the AGP bus 15, the PCI bus, the HDD 18, and the MEM-C 17. The ASIC 16 includes a PCI target, an AGP master, an arbiter (ARB) that is a core of the ASIC 16, a memory controller that controls the MEM-C 17, a plurality of direct memory access controllers (DMACs) that perform image rotation by hardware logic or the like, and a PCI unit that performs data transfer with the engine unit 60 via a PCI bus. A facsimile control unit (FCU) 30, a universal serial bus (USB) 40, and an IEEE1394 (Institute of Electrical and Electronics Engineers 1394) interface 50 are connected to the ASIC 16 via a PCI bus. The operation display unit 20 is directly connected to the ASIC 16.

The MEM-C 17 is a local memory used as a copy image buffer and a code buffer, and the HDD 18 is a storage that stores images, programs, fonts, and forms.

The AGP bus 15 is a bus interface for a graphics accelerator card proposed to increase the speed of graphics processing, and directly accesses the MEM-P 12 with high throughput to increase the speed of the graphics accelerator card.

Figure 3:
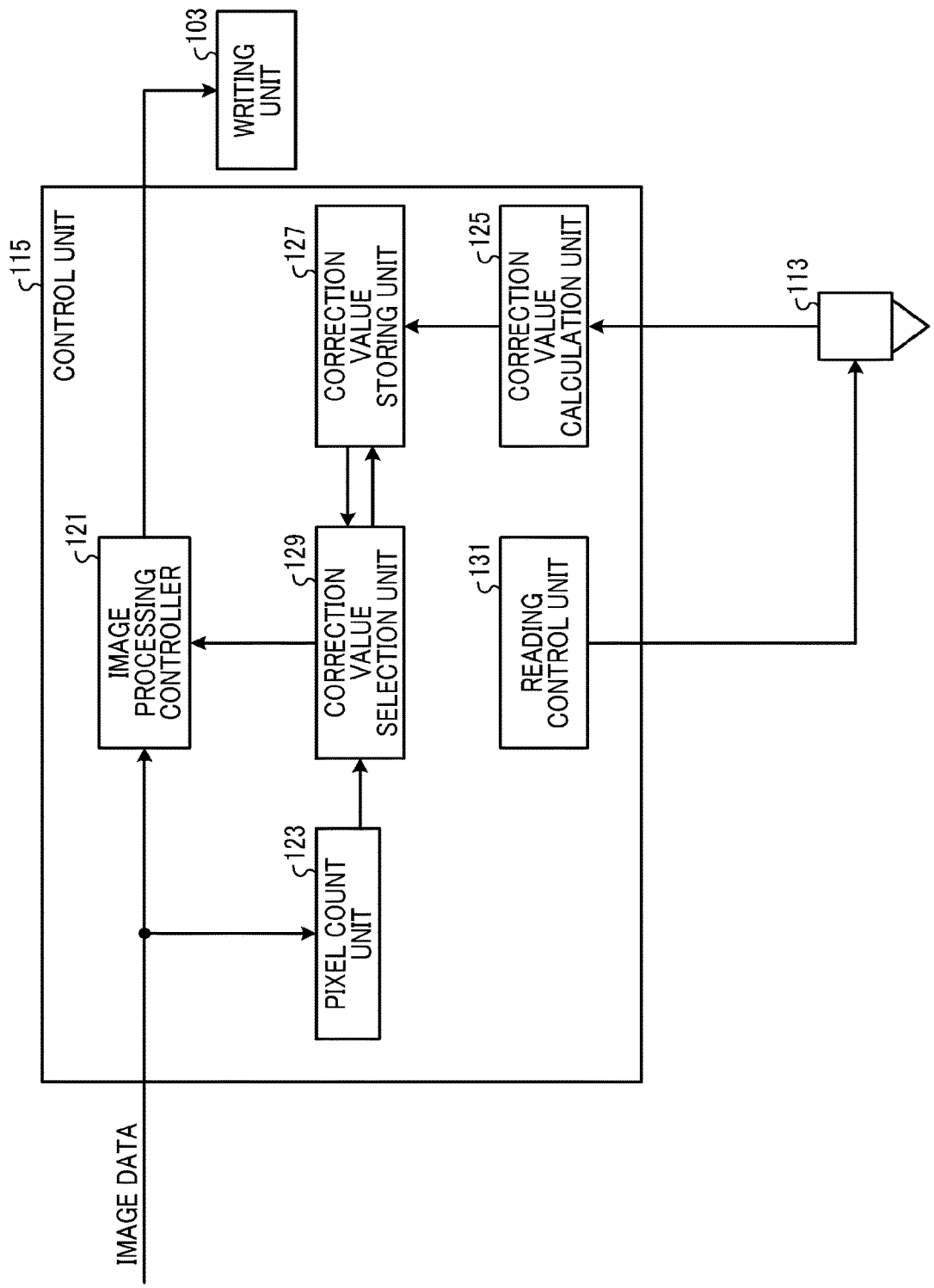
FIG. 3 is a block diagram of an example of the configuration of internal functions of a control unit that corrects image formation positions, according to an embodiment of the present disclosure.

FIG. 3 is a block diagram of an example of the configuration of internal functions of the control unit 115 that corrects image formation positions, according to the present embodiment. The control unit 115 that corrects image formation positions includes, as a functional configuration, an image processing controller 121, a pixel count unit 123, a correction value calculation unit 125, a correction value storing unit 127, a correction value selection unit 129, and a reading control unit 131.

The image processing controller 121 converts image data sent from a host, such as a print server, into a format in which the writing unit 103 can form an image. In addition, the image processing controller 121 corrects an image formation position in accordance with a correction value calculated in advance. Examples of the correction of the image formation position include magnification correction, registration correction, and trapezoidal correction. The image processing controller 121 corresponds to a correction unit. The correction unit corrects an image formation position of an image to be formed on a recording medium, according to mark position data.

The pixel count unit 123 counts the number of pixels included in the transmitted image data for each type of toner (Bk, C, M, and Y). The pixel count will be described in detail later in the description of the adjustment mode.

The correction value calculation unit 125 detects a deviation amount of image formation positions from the sheet shape read by the reading unit 113 and the positions of correction marks and calculates a correction value to form an image at a correct position on the sheet. The correction value calculation unit 125 performs interpolation of data according to the plurality of calculated correction values and stores a correction value uniquely determined for the image density in the correction value storing unit 127. For example, the correction value calculation unit 125 calculates the correction value of the image formation position corresponding to the image density for each of the plurality of image densities corresponding to the plurality of adjustment charts in a one-on-one relationship, in accordance with the reading results of the plurality of adjustment charts. Next, the correction value calculation unit 125 interpolates a plurality of correction values corresponding to a plurality of image densities in a one-on-one relationship to calculate a correction value of an image formation position corresponding to another image density different from the plurality of image densities. The calculation of the correction value will be described in detail later in the description of the adjustment mode.

The correction value storing unit 127 stores a plurality of correction values respectively corresponding to a plurality of image densities. The plurality of correction values stored include a correction value calculated based on the reading result and a stored correction value. The correction value storing unit 127 stores, for example, a plurality of correction values respectively corresponding to a plurality of image densities as a correspondence table (hereinafter, referred to as a density-correction-value correspondence table).

The correction value selection unit 129 selects a correction value to be applied to image data relating to printing in accordance with the result of pixel count, and transmits the selected correction value to the image processing controller 121. The selection of the correction value will be described in detail later in the description of the adjustment mode.

The reading control unit 131 controls the reading unit 113 that reads the shape of the sheet conveyed on a conveyance path and correction marks on the sheet.

Before describing the adjustment mode according to the present embodiment, a comparative example of a method of calculating a correction value and correction functions is described with reference to FIGS. 4 to 8.

Figure 4:
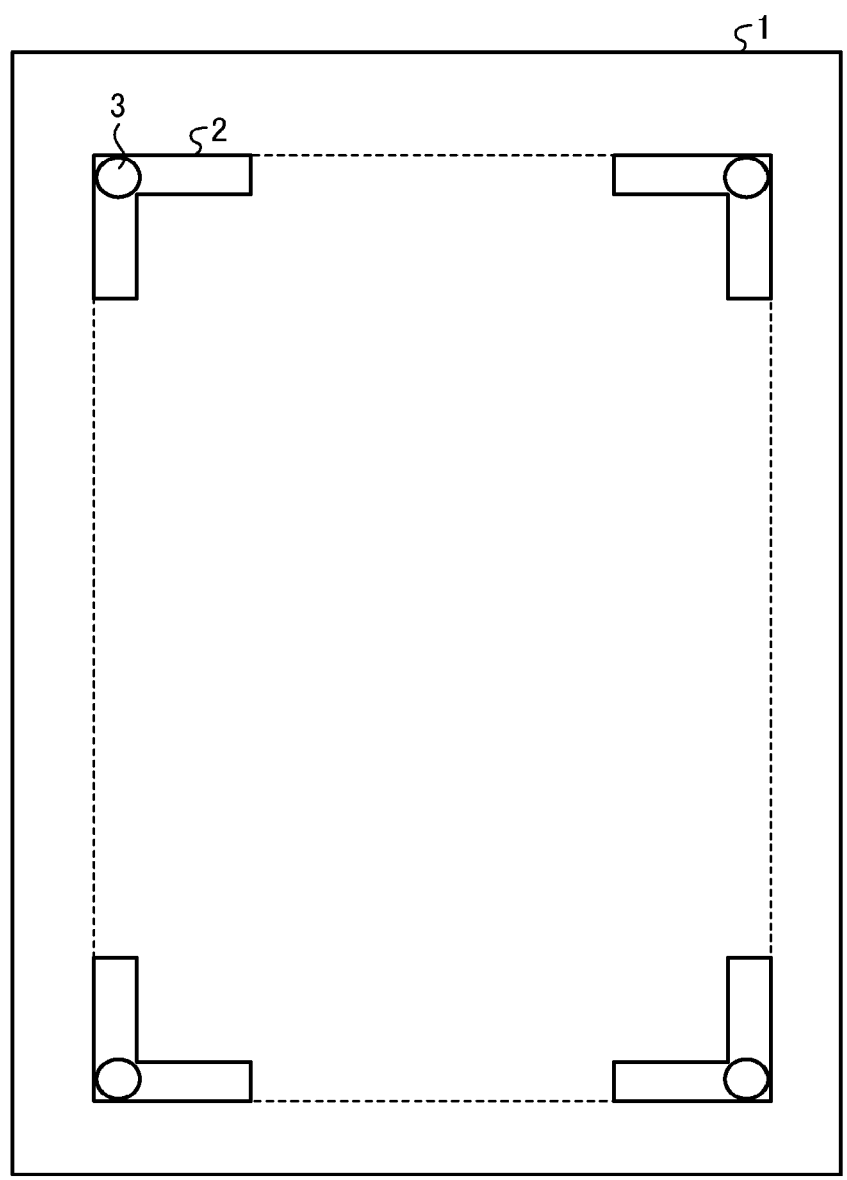
FIG. 4 is an illustration of an example of a plurality of correction marks printed at four corners of a sheet in a comparative example.

FIG. 4 is an illustration of an example of a plurality of correction marks 2 printed at four corners of a sheet 1 in the comparative example. The reading unit 113 acquires the center coordinates 3 of the correction marks 2 at four points and four positions at the corners of the sheet 1 during passage of the sheet 1. That is, the reading unit 113 reads the sheet 1 on which the correction marks 2 are printed, to acquire the coordinates of a total of eight points in the coordinate system related to the sheet 1. The correction value calculation unit 125 calculates a deviation amount of the image positions on the sheet 1 based on the coordinates of the eight points. The reading unit 113 reads the images to acquire the reading results of the images. The correction value calculation unit 125 calculates, as a correction value, an amount by which an image is to be moved to approach an ideal image position to be originally written on the sheet 1, based on the reading result and the deviation amount.

Figure 5:
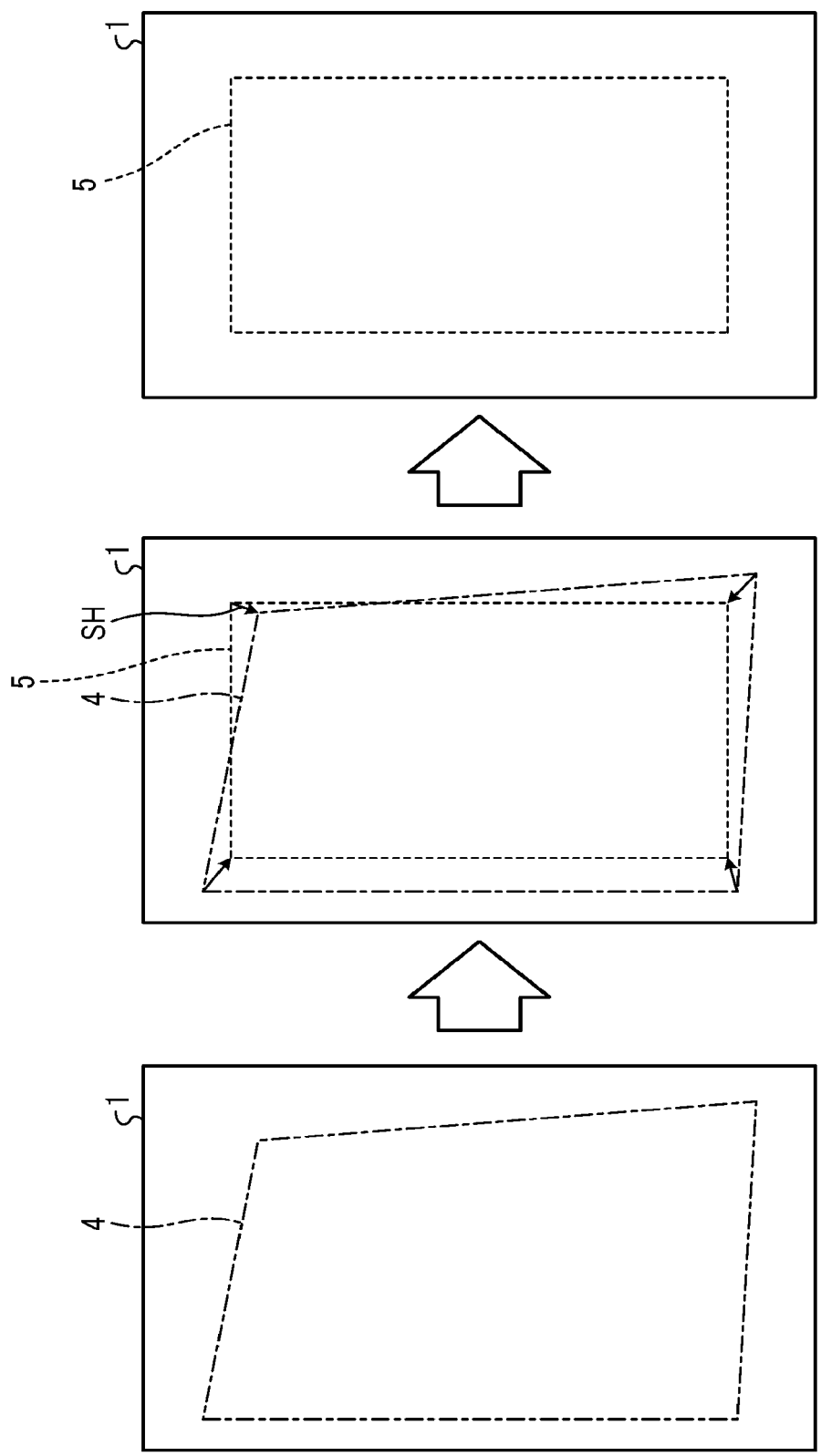
FIG. 5 is an illustration of an example of an image reading result, an ideal image position, and a correction value in a comparative example.
Figure 6:
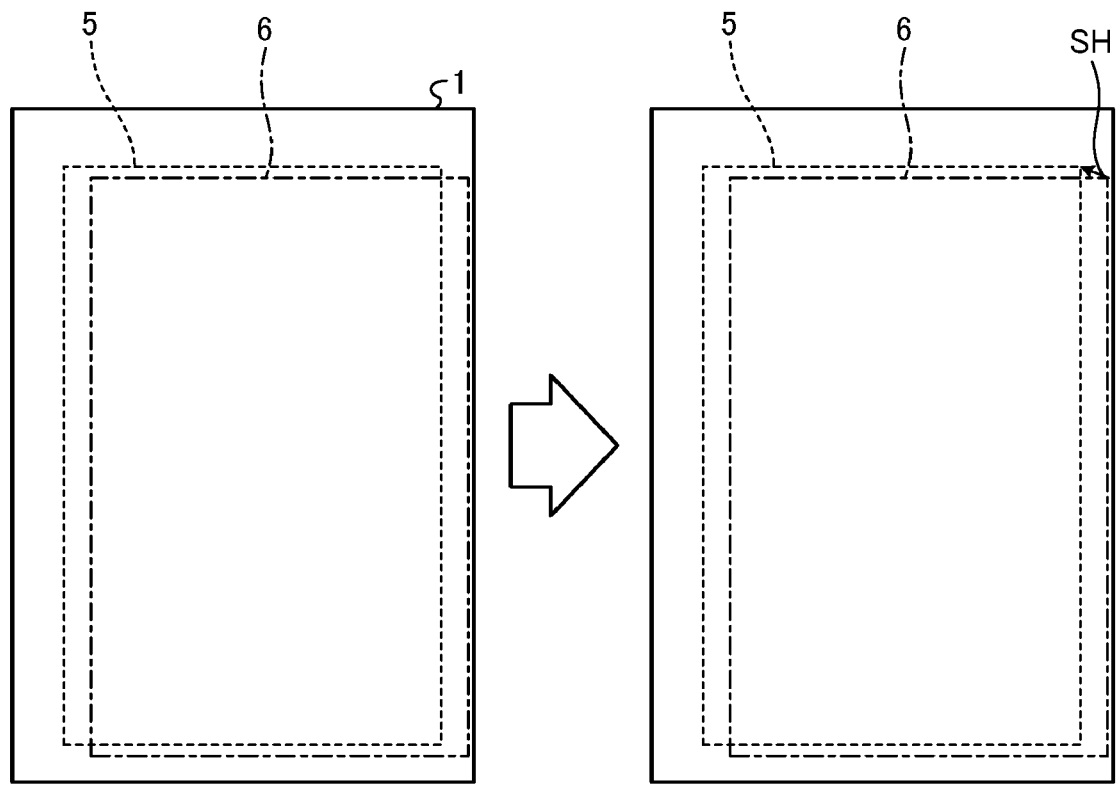
FIG. 6 is an illustration of a function of offsetting an image position from an actual image position to an ideal image position in a comparative example.
Figure 7:
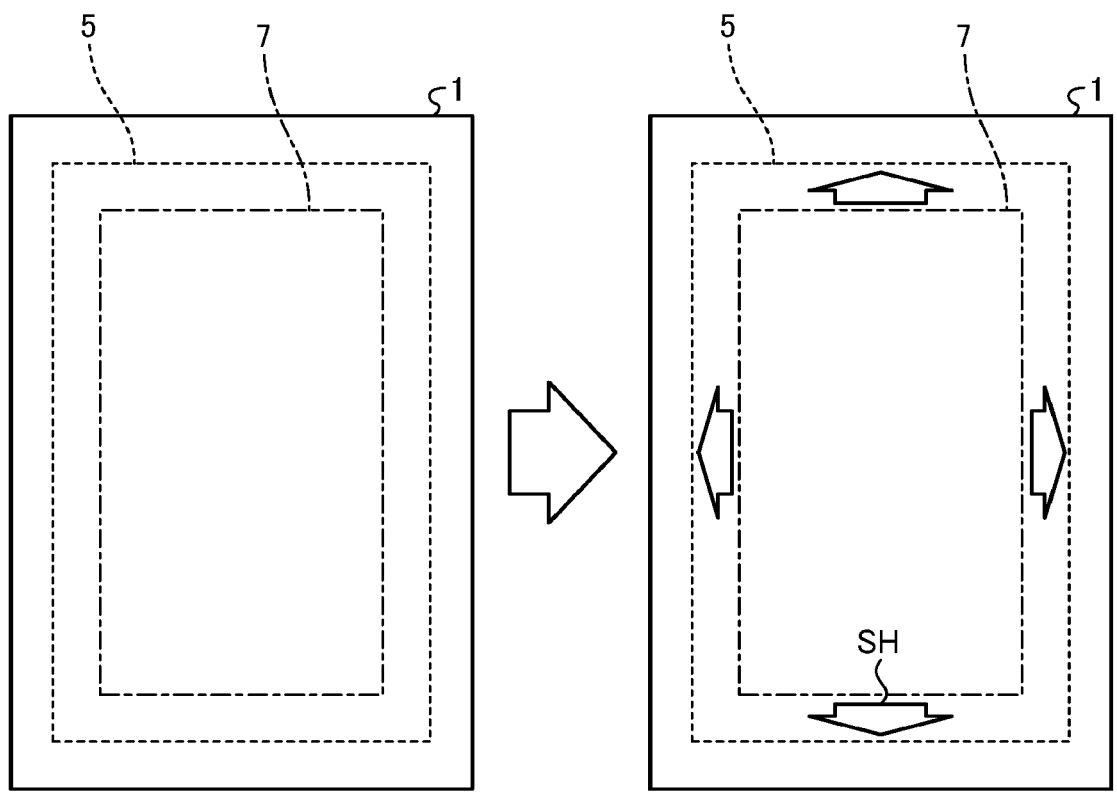
FIG. 7 is an illustration of a magnification adjustment function of expanding and contracting an actual image position to approach an ideal image position in a comparative example.
Figure 8:
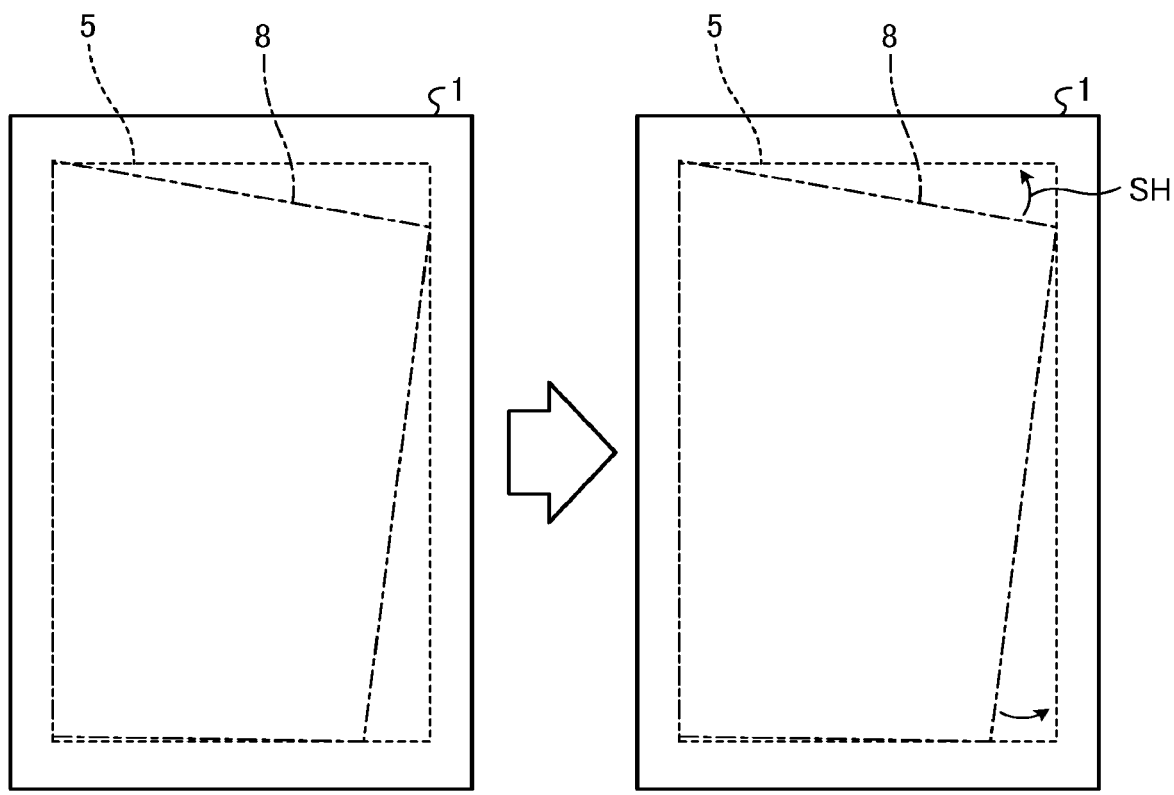
FIG. 8 is an illustration of a skew correction function of inclining an actual image position to approach an ideal image position in a comparative example.

FIG. 5 is an illustration of an example of an image reading result 4, an ideal image position 5, and a correction value in the comparative example. As illustrated in FIG. 5, the correction value calculation unit 125 determines the ideal image position 5 with the deviation amount of the image position with respect to the sheet 1, and calculates a difference between the ideal image position 5 and the reading result 4 to calculate a correction value SH. The calculated correction value SH is reflected in the printing of the image according to a method of feeding back the correction value SH to the image writing, a method of controlling the entering of a sheet to change the leading edge margin, or the like. The correction function in the comparative example includes, for example, a function of directly offsetting the image position from an actual image position 6 to the ideal image position 5 as illustrated in FIG. 6, a magnification adjustment function of expanding or contracting an actual image position 7 to approach the ideal image position 5 as illustrated in FIG. 7, and a skew correction function of inclining an actual image position 8 to approach the ideal image position 5 as illustrated in FIG. 8.

The adjustment mode according to the present embodiment is described below. In the adjustment mode, for example, a density-correction-value correspondence table used for image formation position correction is created based on the reading result and stored in the correction value storing unit 127. That is, when the image formation position correction is performed, the correction value is calculated in the adjustment mode before normal printing is performed.

Figure 9:
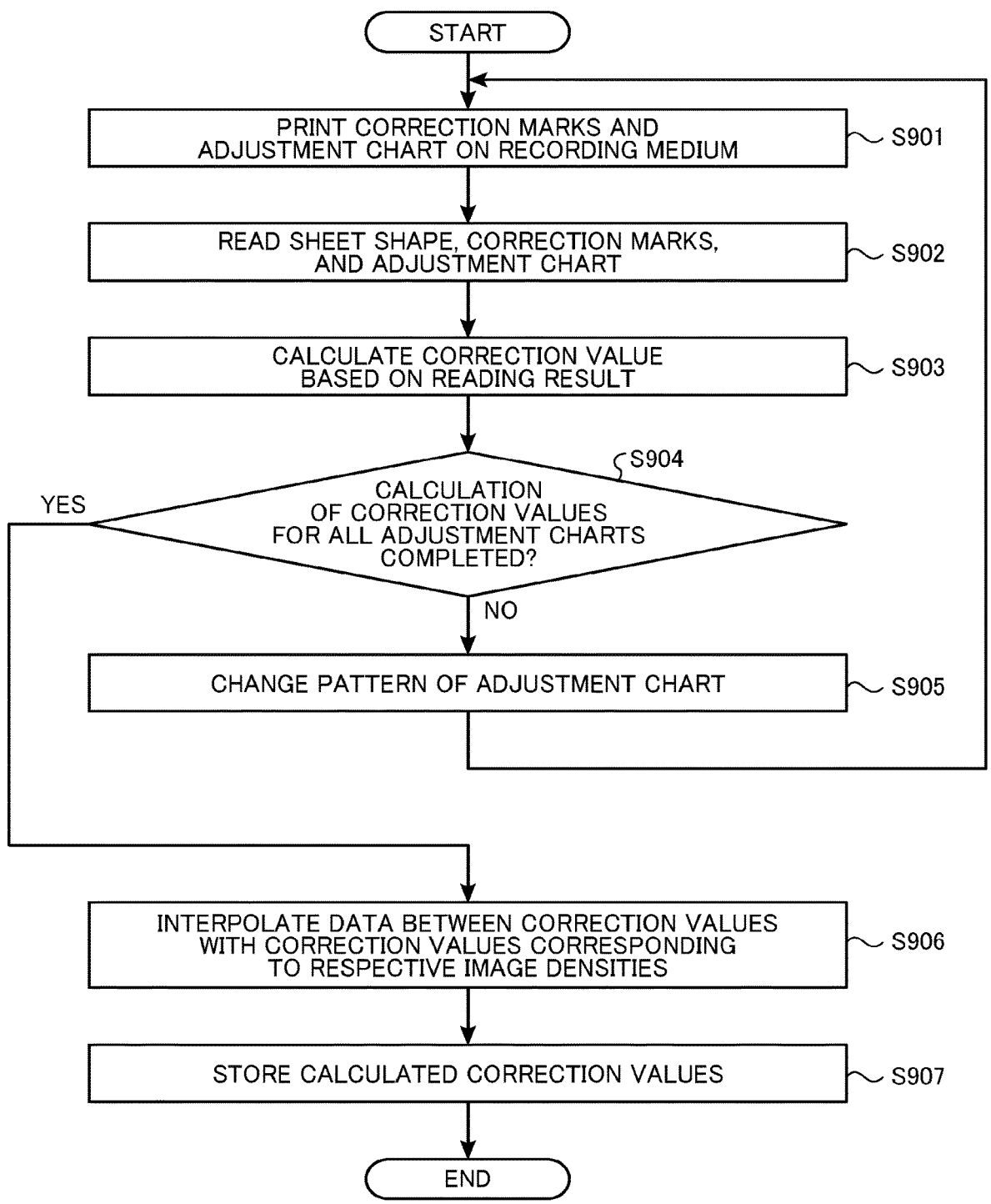
FIG. 9 is a flowchart of a processing procedure of an operation in the adjustment mode in the image forming apparatus according to an embodiment of the present disclosure.

FIG. 9 is a flowchart of an example of a processing procedure of an operation in the adjustment mode in the image forming apparatus 101 according to the present embodiment.

Adjustment Mode

Step S901

Under the control of the control unit 115, the writing unit 103, the image forming unit 105, the secondary transfer unit 109, and the fixing unit 111 print correction marks 2 and adjustment charts on a sheet as a recording medium. The correction marks 2 are printed in order to detect a deviation amount of the image formation positions from a reading result obtained by reading the sheet shape and the correction marks 2. When an image is placed on a sheet in normal printing, a change in the shape of the sheet depends on the toner adhesion amount. Therefore, the adjustment charts are printed in order to approximate an actual change in the sheet shape. For example, when an image having a density of 100% is formed on an A3 size sheet, a deviation of 1.0 mm may occur in image print positions on the front and back sides in a conveyance direction of the sheet. Alternatively, when an image having a density of 25% is formed on an A3 size sheet, a deviation of 0.5 mm may occur in image print positions on the front and back sides in the conveyance direction.

Figure 10:
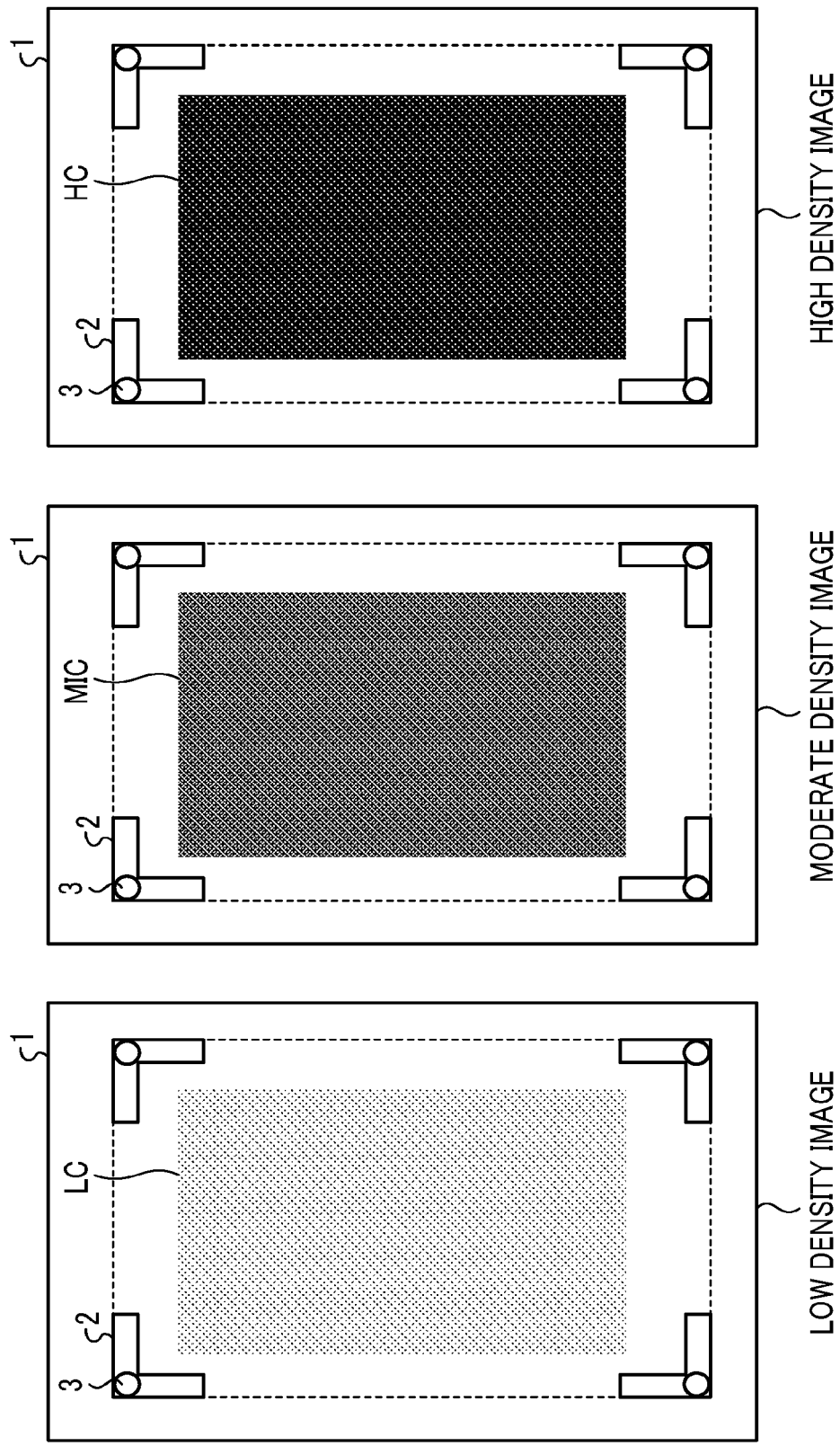
FIG. 10 is an illustration of three types of adjustment charts having different image densities and a plurality of correction marks, according to an embodiment of the present disclosure.

The adjustment charts are stored in, e.g., the ROM 12a according to image densities. Images of a plurality of patterns with different densities are used as the adjustment charts. Examples of the images of the plurality of patterns with different densities includes a low-density image with a small amount of toner adhesion, a high-density image with a large amount of toner adhesion, and an intermediate-density image with an intermediate amount of toner adhesion. FIG. 10 is an illustration of an example of three types of adjustment charts having different image densities and a plurality of correction marks 2. The number of types of image densities used in the operation of the adjustment mode are not limited to three, and may be set to any suitable number.

Step S902

The reading unit 113 reads a sheet on which the correction marks 2 and the adjustment chart (for example, an adjustment chart LC, MIC, or HC in FIG. 10) are printed, to read the shape of the sheet, the correction marks 2, and the adjustment chart. The reading unit 113 outputs the reading result to the correction value calculation unit 125.

Step S903

The correction value calculation unit 125 detects a deviation amount of the image formation position from the reading result and calculates a correction value for forming an image at a correct position on the sheet. The correction value is temporarily stored in a memory in association with the image density on the read sheet.

Step S904

The control unit 115 determines whether the calculation of the correction values for all the adjustment charts has been completed. When the calculation of the correction values for all the adjustment charts has not been completed (NO in step S904), the processing of step S905 is executed. When the calculation of the correction values in all the patterns of the plurality of adjustment charts has been completed (YES in step S904), the processing of step S906 is executed.

Step S905

The control unit 115 changes the patterns of the adjustment chart printed in step S901. For example, the control unit 115 changes the image density of the adjustment chart printed in step S901. The process of steps S901 to S904 is repeated with another adjustment chart having a different image density. Through the repeated processes, the calculation operation of the correction value is performed a plurality of times while changing the patterns of the adjustment chart. The correction value of the image formation position corresponding to the image density is calculated for each of a plurality of image densities corresponding to the plurality of adjustment charts in one-on-one relationship, based on the reading results of the plurality of adjustment charts.

Step S906

The control unit 115 interpolates data between a plurality of correction values by using the plurality of correction values respectively corresponding to the plurality of image densities. The data interpolation processing is, for example, linear interpolation or spline interpolation. Note that the data interpolation is not limited to linear interpolation or spline interpolation, and any interpolation may be applied. For example, the control unit 115 interpolates a plurality of correction values corresponding to a plurality of image densities in a one-on-one relationship to calculate a correction value of an image formation position corresponding to another image density different from the plurality of image densities.

Figure 11:
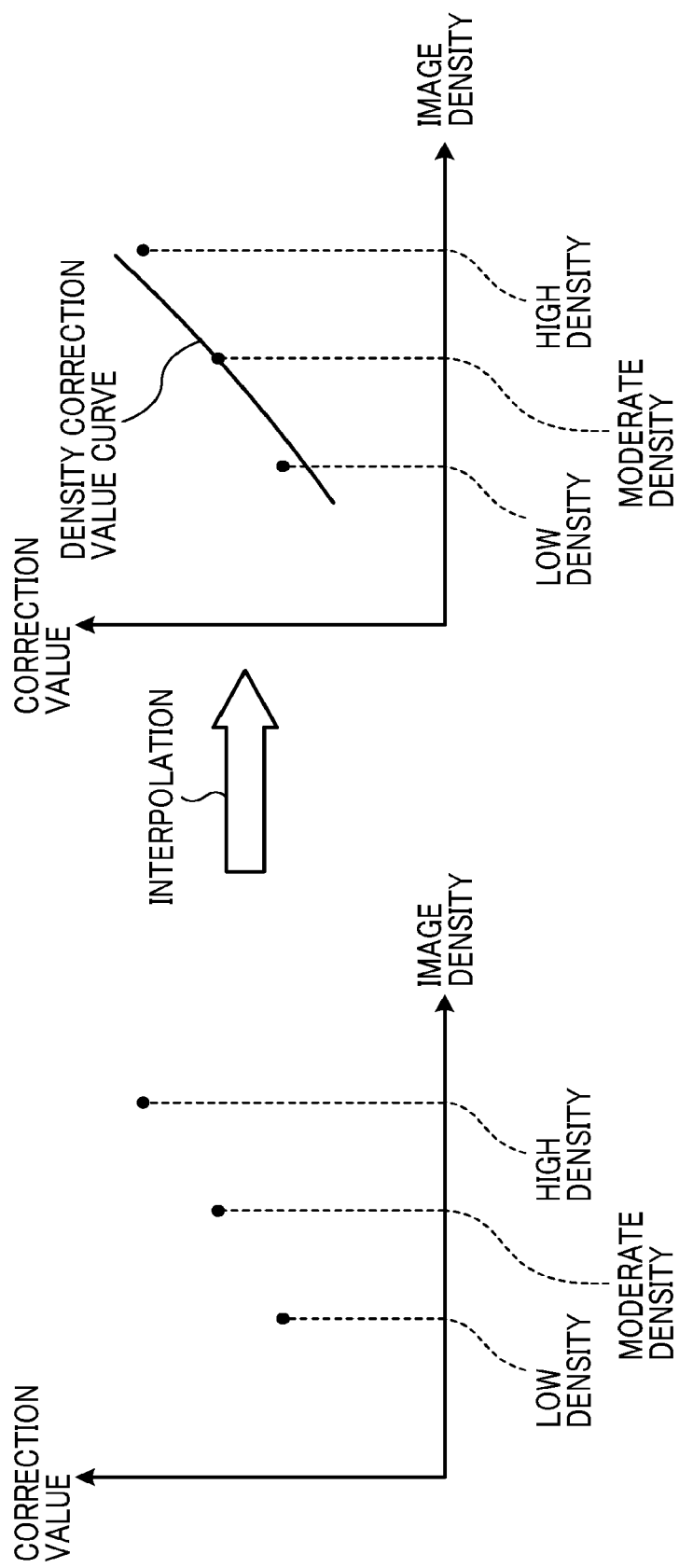
FIG. 11 is a diagram illustrating an example of a density correction value curve indicating a relationship between three correction values respectively corresponding to three image densities before interpolation and a correction value after interpolation with respect to image density, according to an embodiment of the present disclosure.

FIG. 11 is a diagram illustrating an example of a density correction value curve indicating a relationship between three correction values respectively corresponding to three image densities before interpolation and a correction value after interpolation with respect to the image density. As illustrated in FIG. 11, the correction value can be uniquely determined with respect to the image density based on the relationship of the correction value with respect to the image density. The image formation position correction can be performed with higher accuracy in the normal printing mode described later.

Step S907

The control unit 115 stores the correction value calculated in steps S906 and S903 in a memory, such as the correction storing unit 127, in association with the image density. The correction value storing unit 127 stores, for example, a plurality of correction values corresponding to a plurality of image densities, respectively. The correction value storing unit 127 may store a density-correction-value correspondence table indicating correction values for image densities. After the step S907, the adjustment mode ends.

As an application example of the present embodiment, the adjustment mode may calculate a correction value according to the type of toner and the image density. That is, the control unit 115 calculates a plurality of correction values of the image formation position respectively corresponding to the types of toner and the plurality of image densities, based on the reading result of the plurality of adjustment charts. In other words, since the change in the sheet shape also differs depending on the type (color) of the toner, in the present application example, the amount of deviation of the image formation position is detected in the adjustment charts with different colors of toner, to calculate the correction value.

Figure 12:
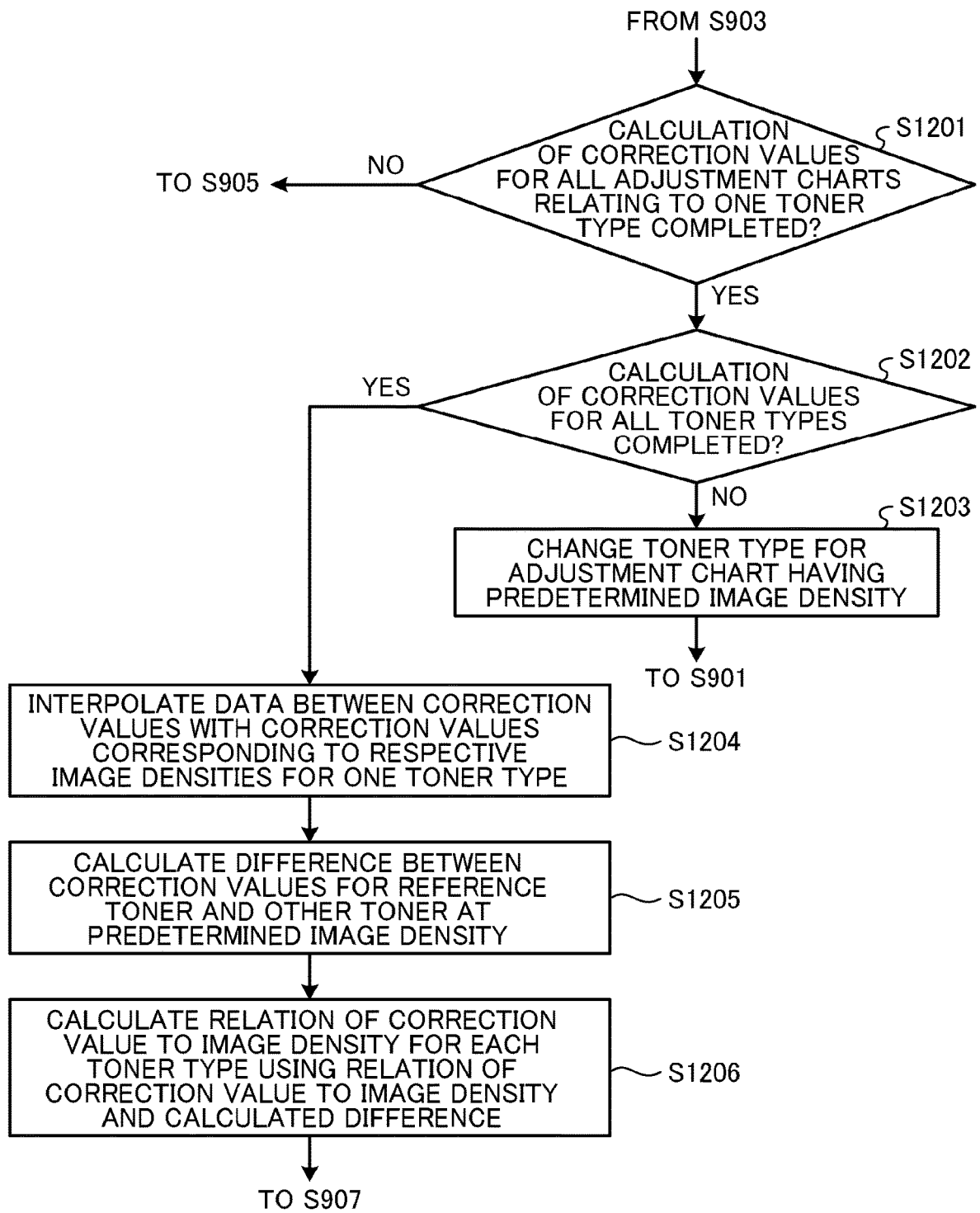
FIG. 12 is a flowchart of a processing procedure of the adjustment mode according to an application example of the present disclosure.

FIG. 12 is a diagram illustrating an example of a processing procedure of the adjustment mode according to the present application example. As illustrated in FIG. 12, the control unit 115 calculates a plurality of correction values of the image formation position respectively corresponding to the types of toner and a plurality of image densities, based on the reading results for the plurality of adjustment charts.

Adjustment Mode

Step S1201

Subsequent to step S903, the control unit 115 determines whether the calculation of the correction value has been completed for all adjustment charts relating to one type of toner. For ease of explanation, the one type of toner is assumed to be black (Bk). When the calculation of the correction values for all the adjustment charts related to the black toner has not been completed (NO in step S1201), the processing of step S905 is executed. When the calculation of the correction values has been completed in all the adjustment charts related to the black toner (YES in step S1201), the processing of step S1202 is executed.

Step S1202

The control unit 115 determines whether the calculation of the correction values for all the toner types has been completed. When the calculation of the correction values for all the toners has not been completed (NO in step S1202), the processing of step S1203 is executed. When the calculation of the correction values for all the toners has been completed (YES in step S1202), the processing of step S1204 is executed.

Step S1203

The control unit 115 changes the type of toner for an adjustment chart having a predetermined image density. For the sake of simplicity, the predetermined image density is assumed to be a high density. For example, the control unit 115 changes the toner in printing on the adjustment chart corresponding to the high density. The processing of steps S901 to S903 is repeated with the changed toner and the high-density adjustment chart. For example, in step S901, the reading unit 113 reads each of a plurality of recording media on which a plurality of marks and each of a plurality of adjustment charts are formed in accordance with the type of toner.

Figure 13:
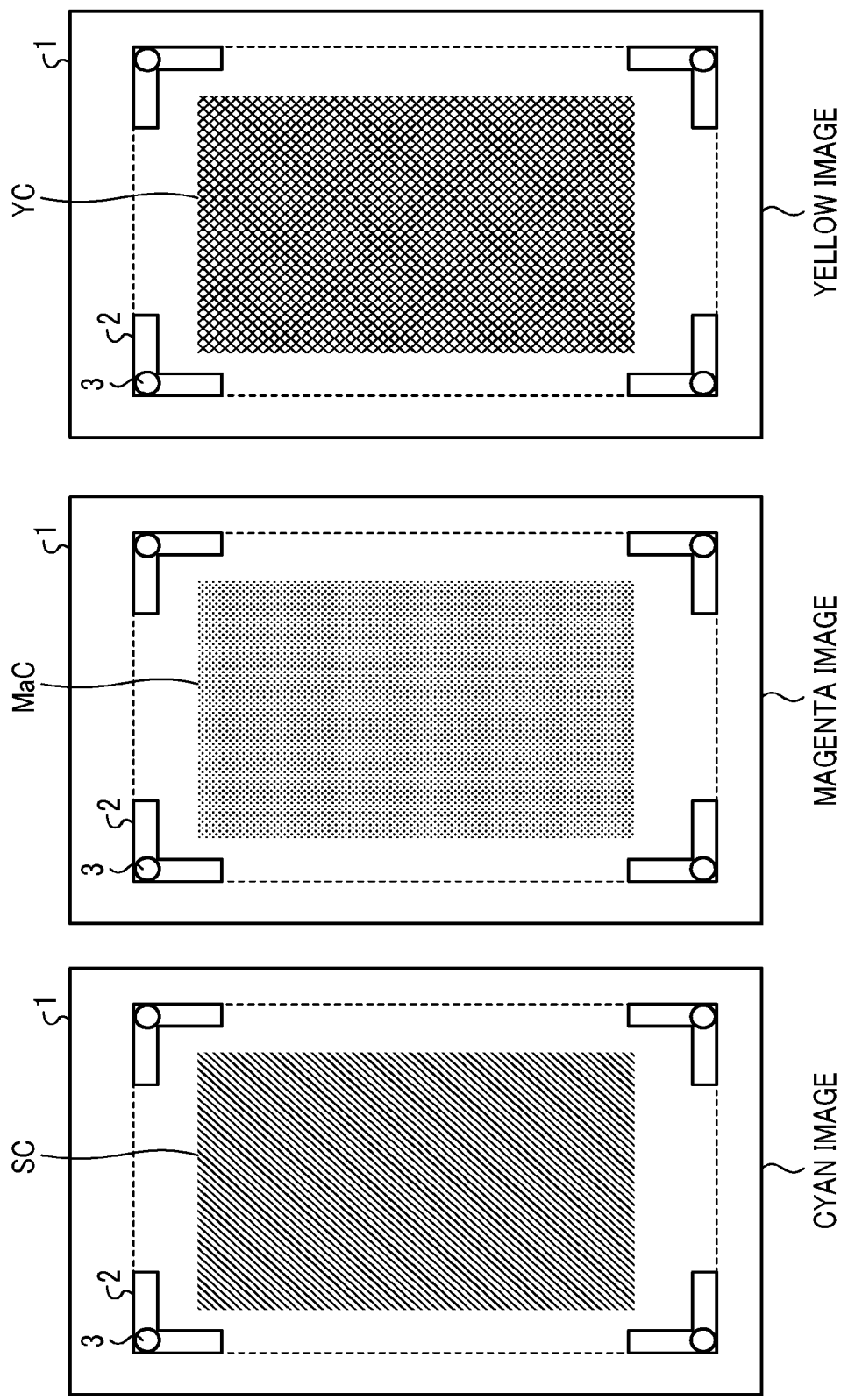
FIG. 13 is an illustration of an example of adjustment charts for toners other than black, according to an application example of the present disclosure.

FIG. 13 is an illustration of an example of adjustment charts for toners other than black. FIG. 13 depicts an adjustment chart SC corresponding to a cyan image, an adjustment chart MaC corresponding to a magenta image, and an adjustment chart YC corresponding to a yellow image. In FIG. 13, different types of toner are indicated by different hatchings.

Through the repeated processing, the calculation operation of the correction values is performed a plurality of times while changing the toner related to the printing of the adjustment chart of the high density. A plurality of correction values of the image formation position respectively corresponding to the types of the toner and the plurality of image densities are calculated based on the reading result for each of the plurality of adjustment charts having different types of toner.

Step S1204

The control unit 115 interpolates data between a plurality of correction values with the plurality of correction values respectively corresponding to the plurality of image densities for the one type of toner. The processing in step S1204 is the same as the processing in step S906 as the processing using the correction values related to the black toner, the description thereof is omitted for simplicity.

Step S1205

The correction value calculation unit 125 calculates a difference between a correction value of a reference toner (hereinafter, referred to as a reference correction value) and a correction value of another toner at a predetermined image density. For example, the correction value calculation unit 125 subtracts a correction value for a toner color different from black from a correction value for the toner color of black and an image density corresponding to the predetermined image density (high density). That is, the correction value calculation unit 125 calculates a difference value between the correction value for each toner color in the high-density image and the correction value for black corresponding to the high-density image.

Step 1206

The correction value calculation unit 125 calculates the relationship between the correction value and the image density for each type of toner by using the relationship between the correction value and the image density and the calculated difference. For example, the correction value calculation unit 125 calculates a correction value that is uniquely determined for the image density for each type of toner, by using the correction value (after interpolation) for the image density calculated in step S1204 and the difference value calculated in step S1205. The correction value calculation unit 125 stores a correction value uniquely determined for the image density for each type of toner in the correction value storing unit 127 as, for example, a density-correction-value correspondence table.

Figure 14:
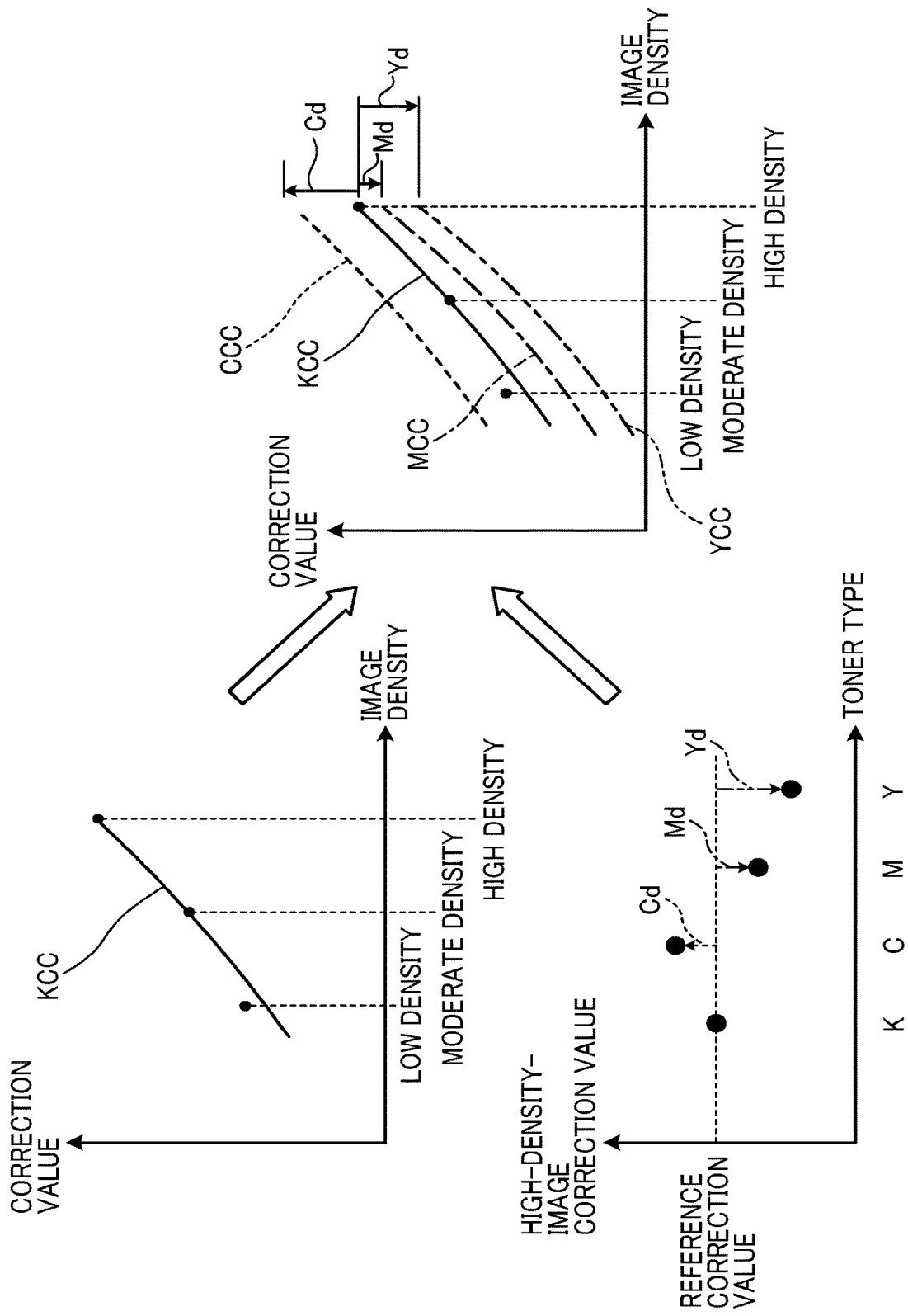
FIG. 14 is a diagram illustrating an example of a density correction value curve calculated for each type of toner using a black density correction value curve and a difference value for each type of toner according to an application example of the present disclosure.

FIG. 14 includes graphs of an example of density correction value curves (a cyan density correction value curve CCC, a magenta density correction value curve MCC, and a yellow density correction value curve YCC) calculated for each type of toner by using a black-color (bk) density correction value curve KCC calculated in step S1204 and the difference values (cyan difference value Cd, magenta difference value Md, and yellow difference value Yd) calculated in step S1205. As illustrated in FIG. 14, the density correction value curve for each toner type can be calculated with the density correction value curve KCC for the Bk color and the difference value for each toner type with respect to the reference correction value.

In the description of the adjustment mode with reference to FIGS. 9 and 12, the density-correction-value correspondence table is calculated using the correction value data (after interpolation) calculated for one color (for example, Bk color). However, the adjustment mode is not limited to such processing, and for example, the adjustment mode illustrated in FIG. 9 may be executed for each type of toner. That is, the printing position deviation amount may be detected with adjustment charts in which the image density is changed for each type of toner, to calculate the correction value. At this time, a more accurate correction value can be calculated for each type of toner.

Figure 15:
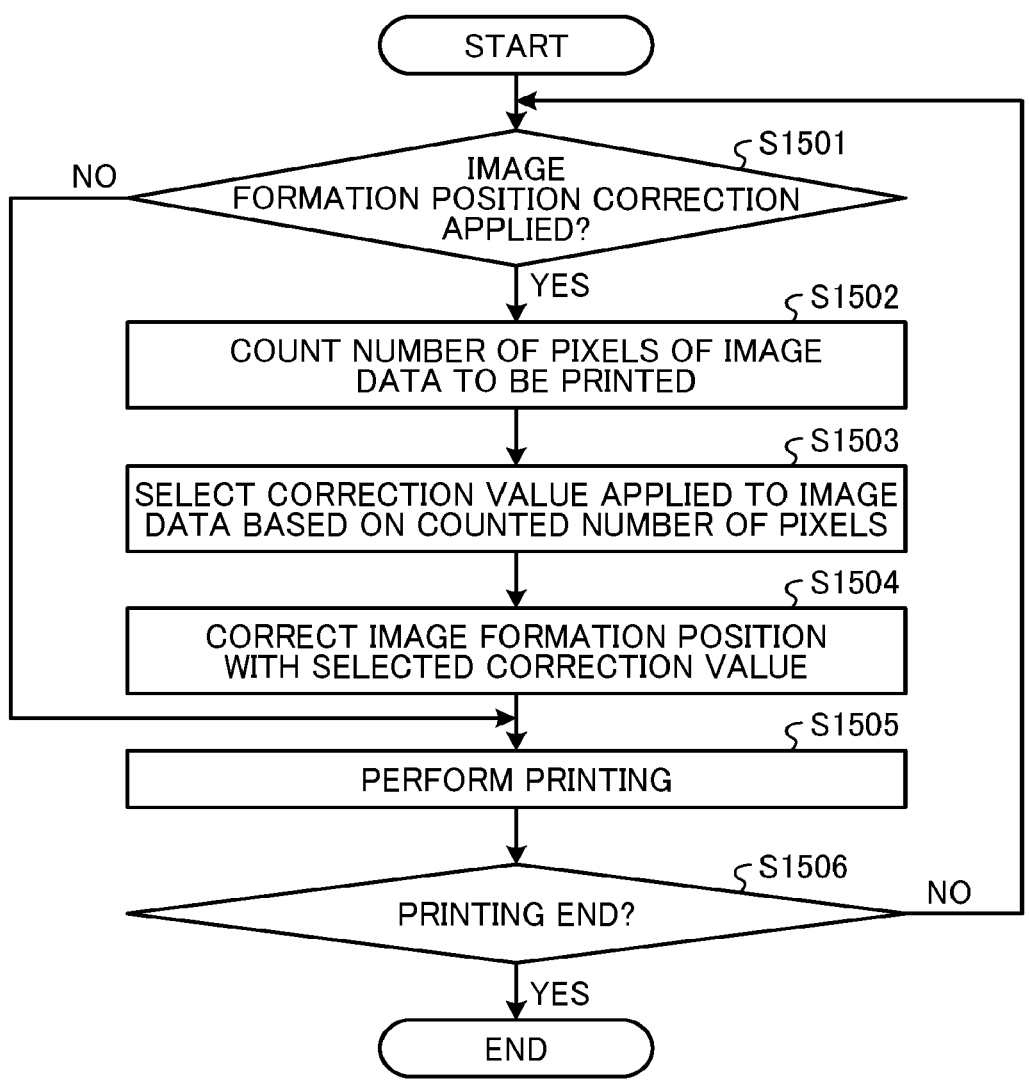
FIG. 15 is a flowchart of an example of a processing procedure of image formation position correction according to an embodiment of the present disclosure.

Below, a processing procedure for correcting the image formation position in normal printing mode according to the present embodiment is described. It is assumed that the calculation of the correction value has been completed in the adjustment mode before the execution of the normal printing mode. FIG. 15 is a flowchart of an example of a processing procedure of image formation position correction according to the present embodiment.

Normal Printing Mode

Step S1501

Whether to apply the image formation position correction is input by an instruction of the operator via the operation display unit 20. Note that whether the image formation position correction needs to be applied may be set in advance as a print setting. When the image formation position correction is applied in printing (YES in step S1501), the processing of step S1502 is executed. When the image formation position correction is not applied in printing (NO in step S1501), the processing of step S1505 is executed.

Step S1502

The pixel count unit 123 counts the number of pixels included in image data to be printed, that is, an image to be formed, which is transmitted from a host (such as a print server), for each type of toner of K, C, M, and Y and each image density. The pixel count unit 123 outputs the number of pixels counted for each type of toner and each image density to the correction value selection unit 129. As illustrated in FIG. 11, when the density correction value curve is not calculated for each type of toner and the correction value for the image density is simply calculated, the number of pixels is counted for each image density regardless of the type of toner. At this time, the pixel count unit 123 outputs the number of pixels for each image density to the correction value selection unit 129.

Step S1503

A correction value selection unit 129 selects a correction value to be used for correcting the image formation position from a plurality of correction values in the density correction value curve by using the number of pixels counted for the image to be formed. That is, the correction value selection unit 129 selects a correction value to be applied to image data to be printed from the correction value storing unit 127 in accordance with the count result of the number of pixels. For example, the correction value selection unit 129 specifies the maximum number of pixels (hereinafter, referred to as the maximum number of pixels) among the number of pixels counted according to the image density for each type of toner. Next, using the image density corresponding to the maximum number of pixels and the density correction value curve for each type of toner illustrated in FIG. 14, the correction value selection unit 129 selects a correction value relating to the image density corresponding to the maximum number of pixels from a plurality of correction values respectively corresponding to a plurality of image densities for each toner type. A density-correction-value correspondence table may be used instead of the density correction value curve. The correction value selection unit 129 reads the selected correction value from the correction value storing unit 127 and outputs the selected correction value to the image processing controller 121 serving as a correction unit.

When the density correction value curve is not calculated for each type of toner and the correction value for the image density is simply calculated, the correction value selection unit 129 selects the correction value for the image density corresponding to the maximum number of pixels from the plurality of correction values respectively corresponding to the plurality of image densities by using the image density corresponding to the maximum number of pixels and the density correction value curve illustrated in FIG. 11.

Step S1504

The image processing controller 121 perform image formation position correction with the selected correction value to form an image at a correct position on a sheet.

Step S1505

Next, the image processing controller 121 controls, e.g., the writing unit 103 to form and print the image on the sheet.

Step S1506

If the predetermined job related to printing has not been completed (NO in step S1506), the process of steps S1501 to S1506 are repeated. When the predetermined job ends (YES in step S1506), the normal print mode ends.

The image forming apparatus 101 according to the present embodiment forms a plurality of marks and each of a plurality of adjustment charts having different image densities on a plurality of recording media in accordance with the plurality of image densities, reads each of the adjustment charts and the marks, acquires data on image formation positions of the marks on the recording media based on reading results for the marks, corrects an image formation position of an image to be formed on a recording medium based on the data, calculates a correction value of the image formation position corresponding to an image density for each of the plurality of image densities corresponding to the plurality of adjustment charts on a one-on-one relationship, based on reading results of the plurality of adjustment charts, interpolates the plurality of correction values corresponding to the plurality of image densities on a one-on-one relationship, and calculates a correction value of the image formation position corresponding to another image densities different from the plurality of image densities. Thus, even when the density of the image to be actually printed does not match the density of the adjustment chart, a correction value of the image formation position corresponding to a density close to the density of the image to be actually printed can be calculated The positional-deviation correcting device 201 according to the present embodiment reads a plurality of recording media on which a plurality of marks and each of a plurality of adjustment charts having different image densities are formed in accordance with the image densities, acquires data about the image formation positions of the marks on the recording media based on the reading results of the marks, corrects the image formation position of an image to be formed on a recording medium based on the data, calculates a correction value of the image formation position corresponding to an image density for each of the plurality of image densities corresponding to the plurality of adjustment charts on a one-on-one relationship, and interpolates correction values corresponding to the plurality of image densities on a one-on-one relationship, and calculates a correction value of the image formation position corresponding to another image densities different from the plurality of densities. The positional-deviation correcting device 201 according to the present embodiment selects the correction value used for correcting the image formation position from the plurality of correction values, in accordance with the number of pixels counted for an image to be formed.

The positional-deviation correcting device 201 according to the present embodiment determines the correction value of the printing position deviation amount when an image to be formed is printed on a sheet, in accordance with the relationship of the correction value with respect to the image density generated as described above and the image density corresponding to the maximum number of pixels among the number of pixels counted for each image density in the image to be formed. The image to be formed is printed on the sheet with the determined correction value. As described above, the image forming apparatus 101 and the positional-deviation correcting device 201 according to the present embodiment can select an optimum correction value corresponding to the image density based on actual print image data and apply the selected correction value to positional deviation correction at the time of printing, thus allowing image formation position correction to be performed at high accuracy.

The positional-deviation correcting device 201 according to the present embodiment reads a plurality of recording media on which each of a plurality of adjustment charts and a plurality of marks are formed according to the type of toner, acquires data on the image formation positions of the marks on the recording media based on the reading results of the marks, corrects an image formation position of an image to be formed on a recording medium based on the data, and calculates a plurality of correction values of the image formation positions corresponding to the type of toner and the plurality of image densities based on the reading results of the adjustment charts.

Using the relationship between the correction value and the image density generated for each type of toner and the image density corresponding to the maximum number of pixels among the number of pixels counted for each type of toner and each image density in an image to be formed, the correction value of the printing position deviation amount when the image to be formed is printed on a sheet is determined for each type of toner. The image to be formed is printed on the sheet with the determined correction value for each type of toner. As described above, the positional-deviation correcting device 201 of the present embodiment can select an optimum correction value corresponding to the image density for each type of toner based on actual print image information and apply the selected correction value to positional deviation correction at the time of printing for each type of toner, thus allowing image formation position correction to be performed at high accuracy. That is, the positional-deviation correcting device 201 according to the present embodiment can form an image to be actually printed with a plurality of types of toner, that is, a plurality of colors of toner, and even if the reduction ratio of the image with respect to the sheet varies depending on the type of toner, that is, the color of toner, image formation position correction can be accurately executed.

First Modification

Figure 16:
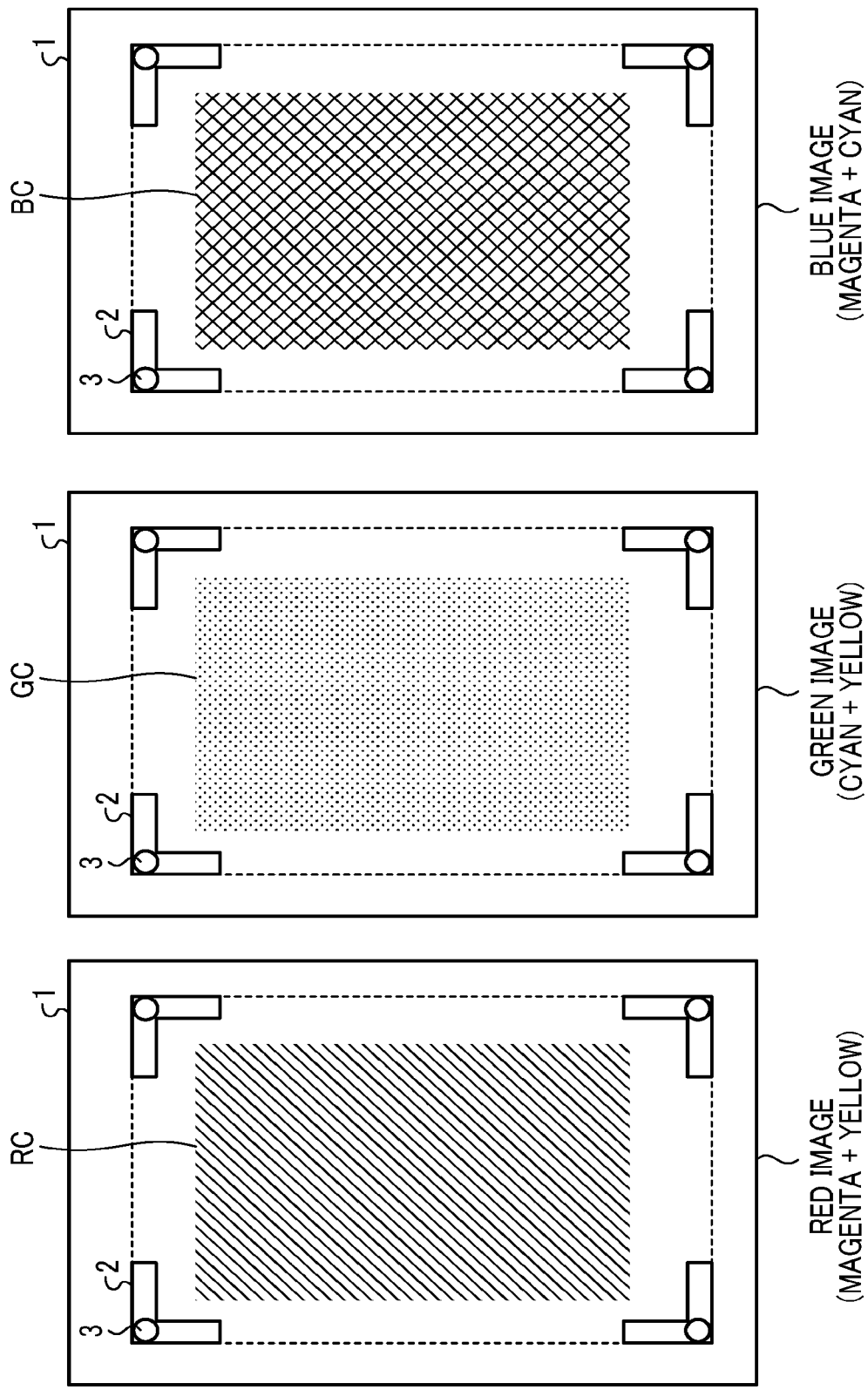
FIG. 16 is an illustration of an example of adjustment charts using a plurality of toner colors according to a first modification of the present disclosure.

The difference between the above-described embodiment and the present modification is that a plurality of correction values of an image formation position with respect to a plurality of image densities are calculated using a mixed color pattern obtained by combining a plurality of toners as an adjustment chart. That is, the control unit 115 calculates a plurality of correction values of an image formation position for a plurality of image densities by using a mixed color pattern obtained by combining a plurality of toners as an adjustment chart. Hereinafter, in order to simplify the description, the hue of an adjustment chart corresponding to the mixed color pattern is assumed to be three types of red (mixed color of magenta and yellow), green (mixed color of cyan and yellow), and blue (mixed color of magenta and cyan). FIG. 16 is an illustration of an example of adjustment charts (red adjustment chart RC, green adjustment chart GC, and blue adjustment chart BC) using a plurality of toner colors. Using these 3 adjustment charts illustrated in FIG. 16, the adjustment mode is executed by the processing procedure illustrated in FIG. 12.

For example, in FIG. 12, the terms "one type of toner" and "reference toner" are replaced with "Bk color toner", the term "all toners" is replaced with "Bk color and all mixed colors", the term "type of toner" is replaced with "type of mixed color", the term "other toners" is replaced with "a plurality of mixed colors", and the term "each toner" is replaced with "each mixed color", thus allowing the adjustment mode in the present modification to be understood. Therefore, the description of the adjustment mode in the present modification is omitted.

To summarize the adjustment mode in the present modification, the amount of deviation of the image formation position is detected in the adjustment chart including a plurality of toners, and the correction value is calculated. For example, the control unit 115 calculates a plurality of correction values of an image formation position for a plurality of image densities by using a mixed color pattern obtained by combining a plurality of toners as an adjustment chart. In the density correction value curve generated by the present modification, for example, as the plurality of correction value density curves illustrated in FIG. 14, the density correction value curve KCC of the Bk color and a plurality of correction value density curves respectively corresponding to a plurality of mixed colors are generated.

In the positional-deviation correcting device 201 according to the present embodiment, a plurality of correction values of the image formation position for a plurality of image densities are calculated using a mixed color pattern obtained by combining a plurality of toners as an adjustment chart. That is, for each of the at least one mixed color and the Bk color, the relationship of the correction value to the image density (correction value density curve or density-correction-value correspondence table) is generated. Using the relationship between the correction value and the image density generated for each color type of mixed colors and Bk color and the image density corresponding to the maximum number of pixels among the number of pixels counted for each type of mixed color and each image density in an image to be formed, the correction value of the printing position deviation amount when the image to be formed is printed on a sheet is determined for each color type of mixed colors and Bk color. The image to be formed is printed on the sheet by using the determined correction value for each color type of mixed colors and Bk color.

As described above, according to the positional-deviation correcting device 201 of the present embodiment, even when a plurality of toners included in an image to be printed changes the sheet shape and the positional deviation of the image formation position varies with the type of mixed color, an optimum correction value according to the image density can be selected for each type of mixed color based on actual print image information and the selected correction value can be applied to positional deviation correction during printing for each type of mixed color, thus allowing image formation position correction to be highly accurately performed on a print image in which a plurality of toners are superimposed.

Second Modification

Figure 17:
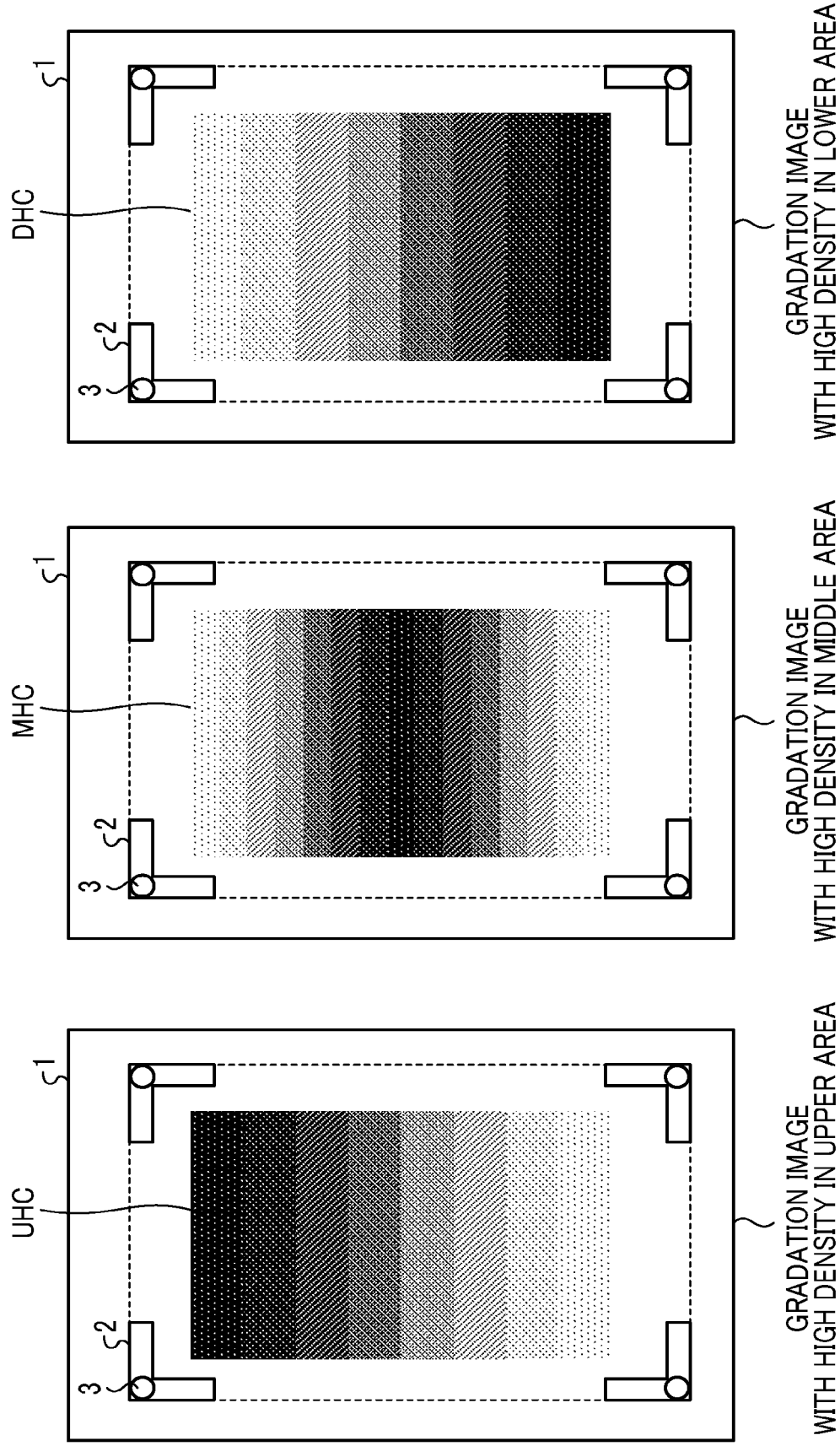
FIG. 17 is an illustration of an example of adjustment charts having different gradations according to a second modification of the present disclosure.

The difference between the above-described embodiment and the present modification is that the correction value of the image formation position is calculated by using an image pattern of non-uniform density (hereinafter referred to as a non-uniform density pattern) as an adjustment chart. That is, the control unit 115 calculates the correction value of the image formation position by using the image pattern having the non-uniform density as the adjustment chart. In the following description, for the sake of simplicity, it is assumed that there are three types of adjustment charts corresponding to non-uniform density patterns, each of which includes an image in which a high-density portion is provided in an upper portion of a sheet, a middle portion of a sheet, or a lower portion of a sheet so as to have a different gradation. FIG. 17 is an illustration of an example of adjustment charts (i.e., an upper high-density image UHC, a middle high-density image MHC, and a lower high-density image DHC) having different gradations. Using the three adjustment charts UHC, MHC, and DHC illustrated in FIG. 17, the adjustment mode is executed by the processing procedure illustrated in FIG. 9. For example, in step S906 in FIG. 9, the adjustment mode in the present modification is understood by replacing "a plurality of image densities" with "a plurality of gradation types". Therefore, the description of the adjustment mode in the present modification is omitted.

Figure 18:
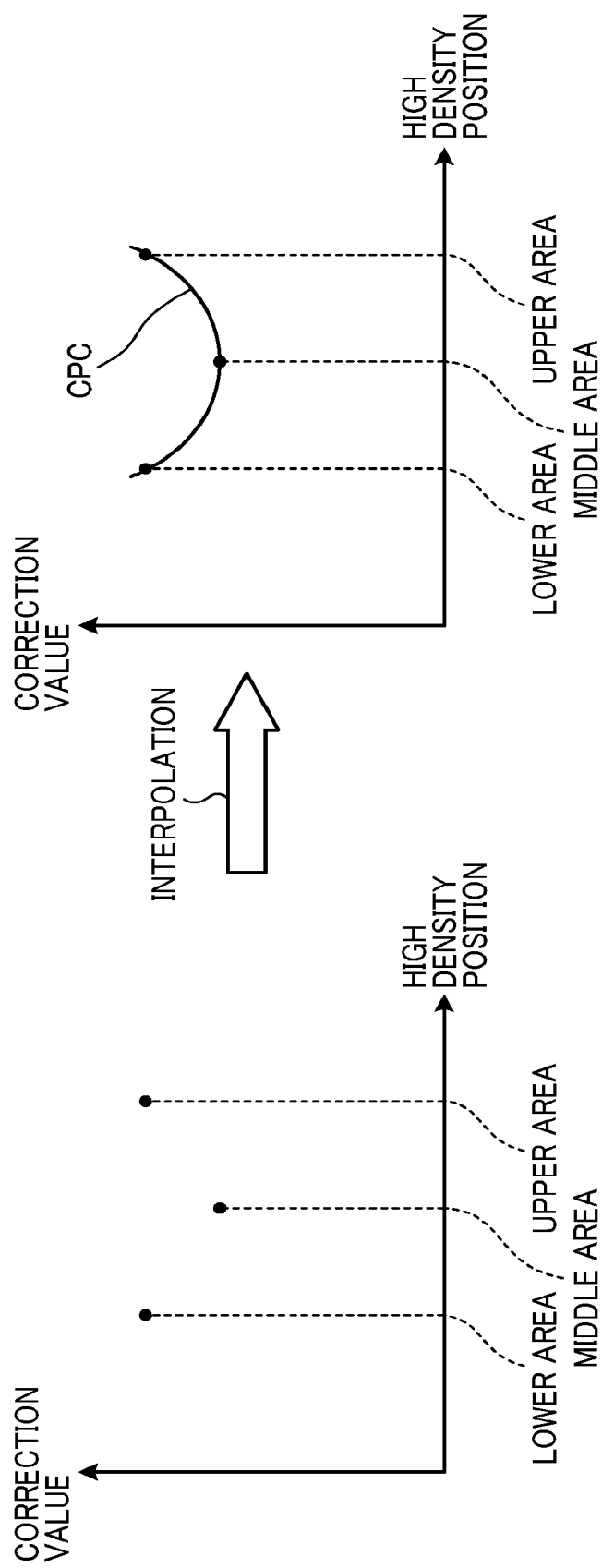
FIG. 18 is a diagram of an example of a density position correction curve CPC indicating a relationship between three correction values respectively corresponding to three high-density positions before interpolation and correction values after interpolation with respect to the high-density positions, according to the second modification of the present disclosure.

To summarize the adjustment mode in the present modification, the amount of deviation of the image formation position is detected in an adjustment chart using an image having gradation, and a correction value is calculated. For example, the control unit 115 calculates the correction value of the image formation position by using the image pattern having the non-uniform density as the adjustment chart. FIG. 18 is a diagram of an example of a density position correction curve CPC indicating a relationship between three correction values respectively corresponding to three high-density positions before interpolation and correction values after interpolation with respect to the high-density positions. A correspondence table (hereinafter, referred to as a high-density-position correction-value correspondence table) or a density position correction curve CPC indicating a correction value after interpolation for a high density position is stored in the correction value storing unit 127.

For example, in the adjustment chart having high-density pixels in the upper portion of the sheet, since the upper portion having a large amount of adhered toner has a larger reduction ratio than the other portions, the shape of the image printed on the sheet becomes trapezoid, and the trapezoid correction is applied as the image position correction. As illustrated in FIG. 18, the correction value for the high density position can be uniquely determined by the relationship of the correction value with respect to the position of the high density pixel (hereinafter, referred to as a high density position). Thus, the image formation position correction can be performed with higher accuracy in the normal printing mode described later.

The processing procedure of the image formation position correction in the present modification conforms to the flowchart illustrated in FIG. 15. Hereinafter, a description is given of steps S1502 and S1503, which are different processes between the present modification and the above-described embodiment. In the present modification, the control unit 115 includes a high-density-position determination unit that determines a high density position, instead of the pixel count unit 123.

Step S1502

The high-density-position determination unit determines a pixel having a high-density pixel value in image data to be printed, that is, an image to be formed, which is transmitted from a host (such as a print server), by threshold processing using, for example, a threshold related to image density. The high-density-position determination unit determines a high density position in the image to be formed by using the determined position of the pixel. The determination of the high density position is not limited to the above-described procedure, and for example, the high density position may be determined using a gradation pattern detected from the image to be formed by an existing technique. The high density position is, for example, included in a range from an upper portion to a lower portion of the sheet. The high-density-position determination unit outputs the determined high density position to the correction value selecting unit 129.

Step S1503

The correction value selection unit 129 selects a correction value to be applied to image data to be printed from the correction value storing unit 127 according to the determined high density position. That is, the correction value selection unit 129 selects the correction value used for correcting the image formation position from the plurality of correction values in the density position correction curve CPC or the high-density-position correction-value correspondence table by using the high density position determined for the image to be formed. The correction value selection unit 129 reads the selected correction value from the correction value storing unit 127 and outputs the selected correction value to the image processing controller 121 serving as a correction unit. The subsequent processing is the same as the processing described in the flowchart illustrated in FIG. 15, and thus a description thereof is omitted for simplicity.

The positional-deviation correcting device 201 according to the present embodiment calculates the correction value of the image formation position by using the image pattern having non-uniform density as the adjustment chart. That is, the relationship of the correction value with respect to the high density position in the gradation (the density position correction curve CPC or the high-density-position correction-value correspondence table) is generated. As described above, the correction value of the printing position deviation amount when the image to be formed is printed on the sheet is determined by using the relationship between the correction value and the high density position in the gradation and the high density position specified in the image to be formed. The image to be formed is printed on the sheet with the determined correction value.

As described above, according to the positional-deviation correcting device 201 of the present embodiment, even when the sheet shape changes due to uneven density of an image to be printed, an optimum correction value corresponding to a high density position is selected based on actual print image information, and the selected correction value is applied to positional deviation correction during printing. Thus, even when the image density of an image to be printed is uneven, a more accurate correction value can be calculated to correct image formation position at high accuracy.

In the above-described embodiments of the present disclosure, the image forming apparatus 101 is described as a multifunction peripheral having at least two functions of a copy function, a printer function, a scanner function, and a facsimile function. However, an image forming apparatus according to the present disclosure is not limited to the multifunction peripheral and may be any image forming apparatus such as a copy machine, a printer, a scanner device, and a facsimile device.

The positional-deviation correcting device 201 and the image forming apparatus 101 according to the present embodiment can apply a correction value based on actual print image data, to perform highly accurate image formation position correction.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A positional-deviation correcting device comprising:
a reader configured to read a plurality of recording media on which a plurality of marks and a plurality of adjustment charts each having different image densities are formed in accordance with the image densities; and
control circuitry configured to:
acquire data on image formation positions of the marks on the plurality of recording media, based on a reading result of the marks;
calculate a plurality of correction values of the image formation positions corresponding to the image densities of the plurality of adjustment charts respectively, based on a reading result of the plurality of adjustment charts;
interpolate the plurality of correction values corresponding to the image densities respectively to obtain a density correction value curve;
count a number of pixels included in an image to be formed on the recording medium for each of the image densities;
select a correction value to obtain a selected correction value in accordance with the number of pixels and the density correction value curve; and
correct an image formation position of the image to be formed on a recording medium with the selected correction value.

2. The positional-deviation correcting device according to claim 1,
wherein the control circuitry is configured to calculate a plurality of correction values of the image formation position for the image densities, based on a reading result of a mixed color pattern in the plurality of adjustment charts.

3. The positional-deviation correcting device according to claim 1,
wherein the control circuitry is configured to calculate the correction value of the image formation position, based on a reading result of an image pattern having a non-uniform density in the plurality of adjustment charts.

4. A positional-deviation correcting device comprising:
a reader configured to read a plurality of recording media on which a plurality of marks and a plurality of adjustment charts corresponding to a plurality of types of toner are formed in accordance with the plurality of types of toner; and
control circuitry configured to:
acquire data on image formation positions of the marks on the plurality of recording media, based on a reading result of the marks;
calculate a plurality of correction values of the image formation positions corresponding to the plurality of types of toner and a plurality of image densities, based on a reading result of the plurality of adjustment charts;
interpolate the plurality of correction values to obtain a density correction value curve for each of the types of toner;

count a number of pixels included in an image to be formed on the recording medium for each of the types of toner and each of the image densities;

select a correction value to obtain a selected correction value in accordance with the number of pixels and the density correction value curve for each of the types of toner; and correct an image formation position of the image to be formed on a recording medium with the selected correction value.

5. The positional-deviation correcting device according to claim 4, wherein the control circuitry is configured to calculate a plurality of correction values of the image formation position for the image densities, based on a reading result of a mixed color pattern in the plurality of adjustment charts.

6. The positional-deviation correcting device according to claim 4, wherein the control circuitry is configured to calculate the correction value of the image formation position, based on a reading result of an image pattern having a non-uniform density in the plurality of adjustment charts.

7. An image forming apparatus, comprising:

an image former configured to form a plurality of marks and a plurality of adjustment charts each having different image densities on a plurality of recording media in accordance with the image densities;

a reader configured to read the plurality of marks and the plurality of adjustment charts; and control circuitry configured to:

acquire data on image formation positions of the marks on the plurality of recording media, based on a reading result of the marks;

calculate a plurality of correction values of the image formation positions corresponding to the image densities of the plurality of adjustment charts respectively, based on a reading result of the plurality of adjustment charts;

interpolate the plurality of correction values corresponding to the image densities respectively to obtain a density correction value curve;

count a number of pixels included in an image to be formed on the recording medium for each of the image densities;

select a correction value to obtain a selected correction value in accordance with the number of pixels and the density correction value curve; and correct an image formation position of the image to be formed on a recording medium with the selected correction value.

* * * * *